US012307078B2

(12) United States Patent
Surjadi

(10) Patent No.: US 12,307,078 B2
(45) Date of Patent: May 20, 2025

(54) SYSTEMS AND METHODS FOR IDENTIFYING AND/OR TRANSFERRING DECORATIVE DESIGN ELEMENTS

(71) Applicant: Canva Pty Ltd, Surry Hills (AU)

(72) Inventor: Desiree Isabelle Surjadi, Ashfield (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/599,999

(22) Filed: Mar. 8, 2024

(65) Prior Publication Data

US 2024/0310986 A1 Sep. 19, 2024

(30) Foreign Application Priority Data

Mar. 13, 2023 (AU) .................... 2023201537

(51) Int. Cl.
*G06F 3/048* (2013.01)
*G06F 3/04817* (2022.01)
*G06F 3/04845* (2022.01)

(52) U.S. Cl.
CPC ...... *G06F 3/04845* (2013.01); *G06F 3/04817* (2013.01)

(58) Field of Classification Search
None
See application file for complete search history.

(56) References Cited

U.S. PATENT DOCUMENTS

| 11,182,136 | B1* | 11/2021 | Xie | G06F 8/34 |
| 2018/0276182 | A1 | 9/2018 | O'donovan | |
| 2019/0087392 | A1 | 3/2019 | Ben-Aharon et al. | |
| 2019/0346981 | A1* | 11/2019 | Pasala | G06F 8/33 |
| 2020/0134605 | A1* | 4/2020 | Grant | G06Q 30/0215 |
| 2020/0160572 | A1* | 5/2020 | Shelman | G06F 3/04845 |
| 2020/0242195 | A1* | 7/2020 | Souche | G06F 40/103 |
| 2020/0380060 | A1 | 12/2020 | Siani et al. | |
| 2021/0004434 | A1* | 1/2021 | Bindal | G06F 40/166 |

(Continued)

FOREIGN PATENT DOCUMENTS

| CN | 112529765 | 3/2021 |
| WO | 2020210867 A1 | 10/2020 |
| WO | 2021155438 A1 | 8/2021 |

OTHER PUBLICATIONS

Extended European Search Report for application EP24163143 mailed Jul. 30, 2024, pp. 1-11.

(Continued)

*Primary Examiner* — Thanh T Vu
(74) *Attorney, Agent, or Firm* — GrowIP Law Group LLC

(57) ABSTRACT

Described herein is a computer implemented method for automatically adding elements to a target design. The method includes identifying one or more source design (SD) element decorations, each SD element decoration corresponding to a design element that was originally defined in a source design and adding each SD element decoration to the target design. Adding a selected SD element decoration to the target design includes: calculating a new position for the selected SD element decoration; calculating a new size for the selected SD element decoration; and adding the selected SD element decoration to the target design using the new size and the new position.

20 Claims, 9 Drawing Sheets

(56) References Cited

U.S. PATENT DOCUMENTS

2022/0075845 A1\* 3/2022 Bowen .................. G06F 30/30
2022/0138402 A1\* 5/2022 Kraus .................... G06N 3/08
715/269

OTHER PUBLICATIONS

Examination Report No. 1 for Australian Patent No. 2023201996 mailed Jun. 23, 2024, pp. 1-4.
Examination Report No. 1 for Australian Application No. 2023201537 mailed May 30, 2023, pp. 1-6.

\* cited by examiner

SYSTEMS AND METHODS FOR IDENTIFYING AND/OR TRANSFERRING DECORATIVE DESIGN ELEMENTS

CROSS-REFERENCE TO RELATED APPLICATION

This application is a U.S. Non-Provisional application that claims priority to Australian Patent Application No. 2023201537, filed Mar. 13, 2023, which is hereby incorporated by reference in its entirety.

TECHNICAL FIELD

Certain aspects of the present disclosure are directed to systems and methods for transferring decorative design elements from one design to another design.

BACKGROUND

Various computer applications for creating and publishing designs exist. Generally speaking, such applications allow users to create a design by, for example, creating a page and adding design elements to that page.

SUMMARY

Described herein is a computer implemented method for automatically adding elements to a target design, the method including: identifying one or more source design (SD) element decorations, each SD element decoration corresponding to a design element that was originally defined in a source design; and adding each SD element decoration to the target design, wherein adding a selected SD element decoration to the target design includes: calculating a new position for the selected SD element decoration, the new position for the selected SD element decoration based on an original position of the selected SD element decoration in the source design; calculating a new size for the selected SD element decoration, the new size for the selected SD element decoration based on an original size of the selected SD element decoration in the source design; and adding the selected SD element decoration to the target design using the new size and the new position.

Figure 1:
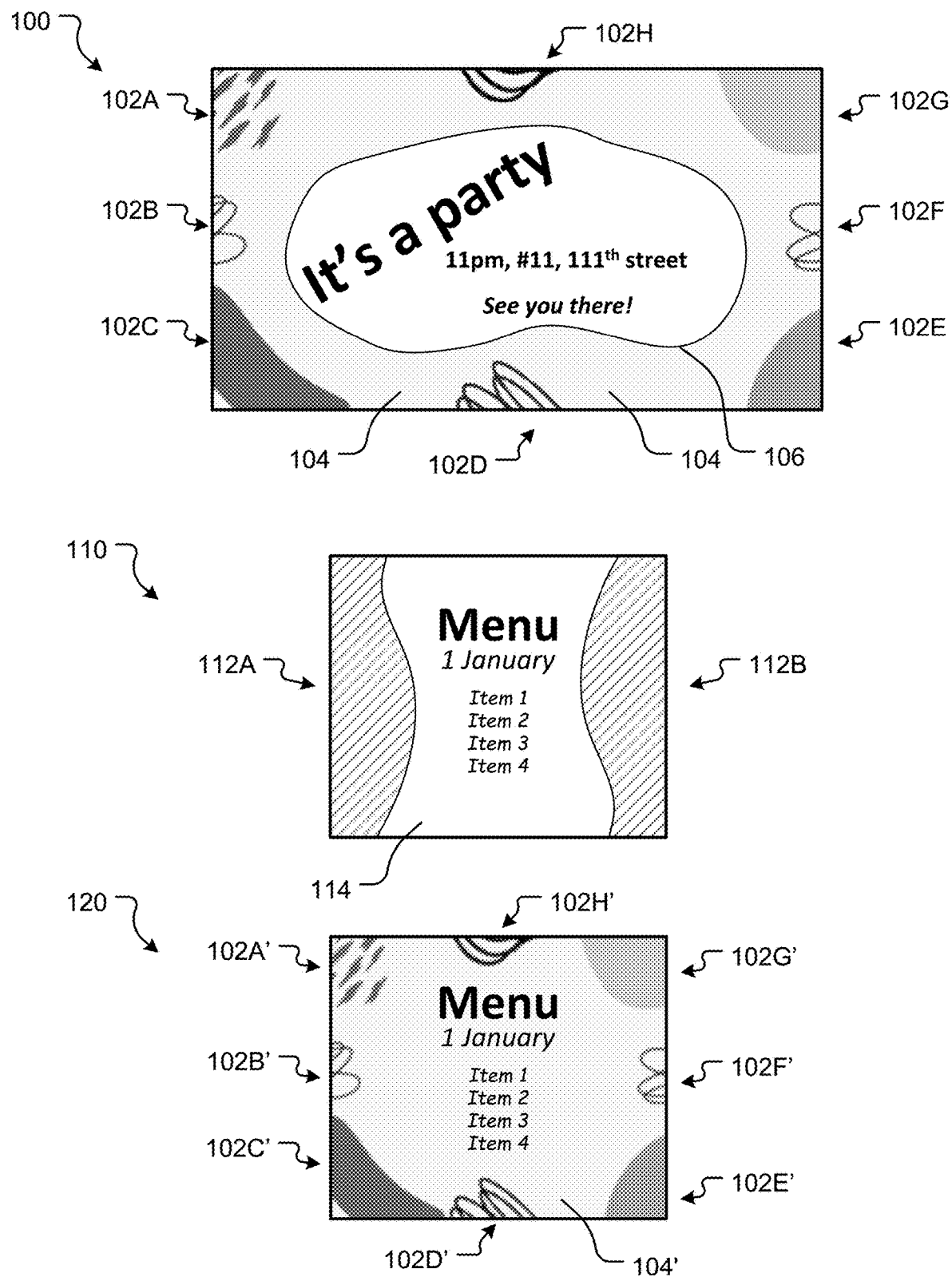
FIG. 1 depicts three example designs.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, computer applications for use in creating designs are known. Such applications will typically provide various functions that can be used in creating and editing designs.

For example, such applications may provide users with the ability to create a new design by copying an existing design and then editing the existing design as desired. Such edits may include: deleting elements of the existing design that are not wanted; editing elements of the existing design that are of use, but not in their original form; and adding new elements. While allowing users to copy an existing design as a starting point can be useful, the process of editing and/or deleting the original design elements can be time consuming and, in some instances, complex. As one example, the existing design may have a different size and/or aspect ratio to the new design a user wants to create. In this case, the elements of the existing design that are to be retained will likely need to be resized and repositioned in order to work in the new design.

In a similar vein, instead of creating a complete copy of an existing design a design application may provide functionality by which a user selects particular elements of an existing design and copies only those selected elements to a new design. This avoids the need for a user to delete unwanted elements from the new design (as they are not copied in the first place), but introduces the additional requirement for a user to select particular elements of the original design to copy. Moreover, when copying selected elements from one design to another the problems with positioning and resizing those elements in the new design remain.

The present disclosure provides techniques for processing an existing design to automatically identify what will be referred to as background decorations.

The present disclosure also provides techniques for transferring a set of background decorations from one design (referred to as a source design) to another design (referred to as a target design). These techniques allow a user to identify an existing design—e.g. one that generally appeals—and use that existing design to either create a new design or modify another design without having to manually select the background decorations of the existing design to transfer and/or resize/reposition those elements in the new design.

In order to illustrate this, consider a scenario in which a user is perusing existing designs to try and create a design for a dinner menu. In doing so, the user may identify a design (referred to in the following as the source design) that has a general appearance they like but has nothing to do with a menu, and another design (referred to in the following as a target design) that is concerned with a menu but has a general appearance that the user does not like.

FIG. 1 provides examples of such a source design 100 and target design 110.

Source design 100 is a party invitation design that includes eight element decorations 102 (102A-102H). Source design 100 has a solid background fill 104 of a particular colour (in this example light grey). Design 100 also includes an internal closed curve element 106, and three text elements reading "It's a party", "1 pm, #11, 111th street", and "See you there!". In FIG. 1 text elements have not been provided with reference numerals in order to avoid obscuring.

Target design 110 is a menu design that includes two element decorations 112 (112A and 112B). Target design 110 does not have has a white background 114 and text elements reading "Menu", "1 January", "Item 1", "Item 2", "Item 3", and "Item 4".

Using the techniques described herein, a design application may be configured to provide a user with the option of automatically transferring the background decorations from source design 100 (the party invitation design) to target design 110 (the menu design). This results in design 120 (which may either be an entirely new design or a version of design 110 that has been automatically edited by the design application). As can be seen design 120: includes the text elements of design 110; does not include decorative elements 112A and 112B of design 110; includes decorative elements 102A'-102H' that have been transferred from design 100 (and correspond to decorative elements 102A-102H of design 100 respectively); and includes a background 104' that has been transferred from design 100. Furthermore, the design application has automatically determined new decorative element positions and sizes for decorative elements 102A'-102H' to account for the target design 110 having a different size and aspect ratio to the source design 100.

The techniques disclosed herein are described in the context of a design platform that is configured to facilitate various operations concerned with digital designs. In the context of the present disclosure, these operations relevantly include processing designs to identify background decorations and/or transferring background decorations of one design to another.

A design platform may take various forms. In the embodiments described herein, the design platform is described as a stand-alone platform (e.g. a single application or set of applications that run on a user's computer processing system and perform the techniques described herein without requiring server-side operations). The techniques described herein can, however, be performed (or be adapted to be performed) by a client-server type design platform (e.g. one or more client applications and one or more server applications that interoperate to perform the described techniques).

Figure 2:
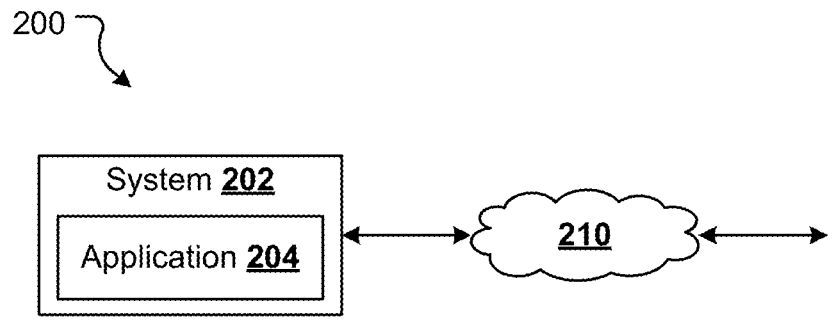
FIG. 2 is a diagram depicting a computing environment in which various features of the present disclosure may be implemented.

FIG. 2 depicts a computer processing system 202 that is configured to perform the various functions described herein. Computer processing system 202 may be any suitable type of computer processing system, for example a desktop computer, a laptop computer, a tablet device, a smart phone device, or an alternative computer processing system.

In this example, computer system 202 is configured to perform the functions described herein by execution of a software application 204—that is, computer readable instructions that are stored in a storage device (such as non-transitory memory 310 described below) and executed by a processing unit of the system 202 (such as processing unit 302 described below).

In the present example, application 204 (and/or other applications of system 202) facilitate various functions related to digital designs. These may include, for example, design creation, editing, storage, organisation, searching, storage, retrieval, viewing, sharing, publishing, and/or other functions related to digital designs.

In the example of FIG. 2, system 202 is connected to a communications network 210. Via network 210 system 202 can communicate with (e.g. send data to and receive data from) other computer processing systems (not shown). The techniques described herein can, however, be implemented on a stand-alone computer system that does not require network connectivity or communication with other systems.

In FIG. 2, system 202 is depicted as having/executing a single application 204. However, system 202 may (and typically will) include additional applications (not shown). For example, and assuming application 204 is not part of an operating system application, system 202 will include separate operating system application (or group of applications).

The techniques and operations described herein are performed by one or more computer processing systems.

Figure 3:
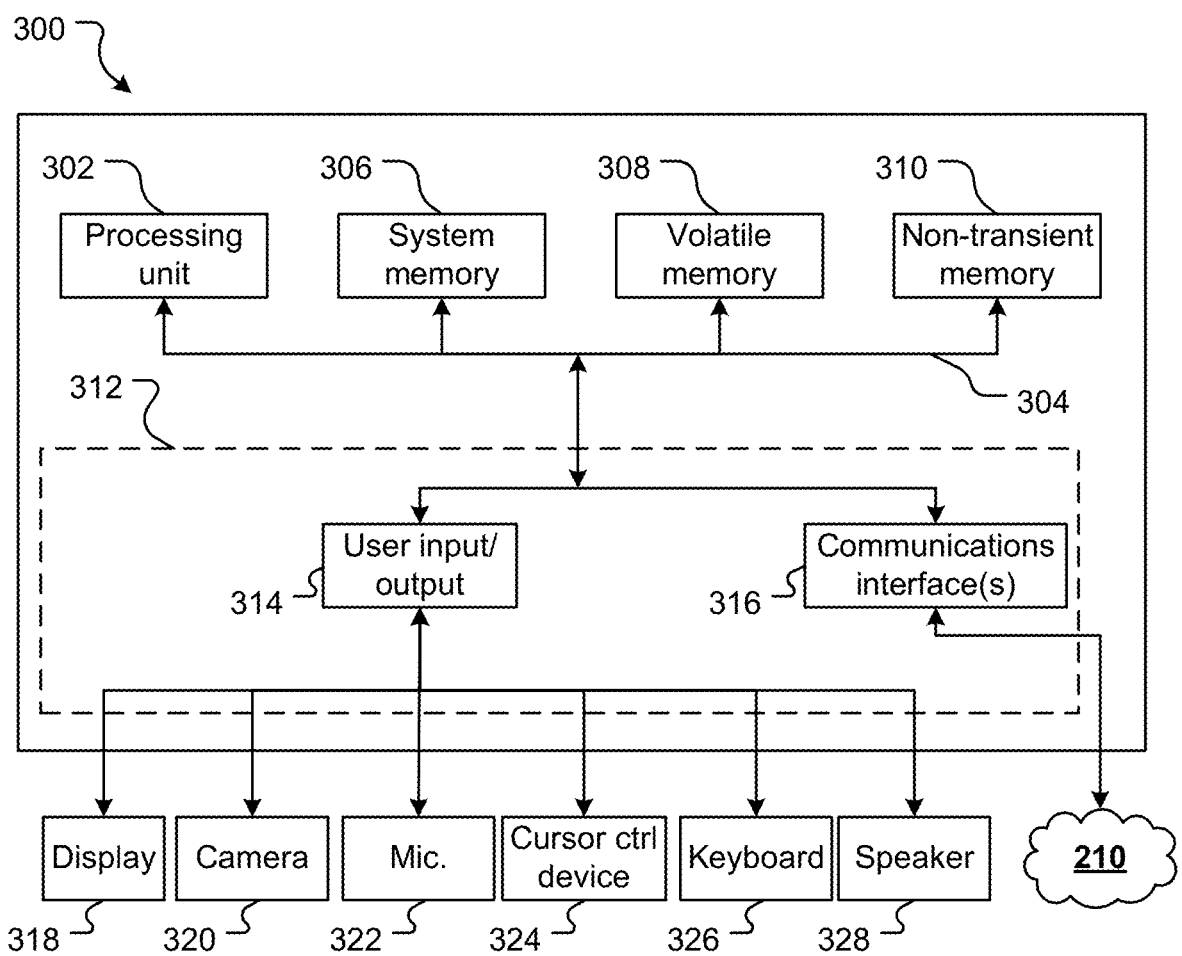
FIG. 3 is a block diagram of a computer processing system configurable to perform various features of the present disclosure.

Turning to FIG. 3, a block diagram depicting hardware component of a computer processing system 300 is provided. The computer processing system 200 of FIG. 2 may be a computer processing system such as 300 (though alternative hardware architectures are possible).

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304 the processing unit 302 is in data communication with a one or more machine readable storage devices (also referred to as memory devices). Computer readable instructions and/or data which are executed by the processing unit 302 to control operation of the processing system 300 are stored on one more such storage devices. In this example system 300 includes a system memory 306 (e.g. a BIOS), volatile memory 308 (e.g. random access memory such as one or more DRAM modules), and non-transitory memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Generally speaking, and depending on the particular system in question, devices to which system 300 connects—whether by wired or wireless means—include one or more input devices to allow data to be input into/received by system 300 and one or more output device to allow data to be output by system 300.

By way of example, where system 300 is a personal computing device such as a desktop or laptop device, it may include a display 318 (which may be a touch screen display and as such operate as both an input and output device), a camera device 320, a microphone device 322 (which may be integrated with the camera device), a cursor control device 324 (e.g. a mouse, trackpad, or other cursor control device), a keyboard 326, and a speaker device 328.

As another example, where system 300 is a portable personal computing device such as a smart phone or tablet it may include a touchscreen display 318, a camera device 320, a microphone device 322, and a speaker device 328.

As another example, where system 300 is a server computing device it may be remotely operable from another computing device via a communication network. Such a server may not itself need/require further peripherals such as a display, keyboard, cursor control device etc. (though may nonetheless be connectable to such devices via appropriate ports).

Alternative types of computer processing systems, with additional/alternative input and output devices, are possible.

System 300 also includes one or more communications interfaces 316 for communication with a network, such as network 210 of FIG. 1. Via the communications interface(s) 316, system 300 can communicate data to and receive data from networked systems and/or devices.

System 300 stores or has access to computer applications (also referred to as software or programs)—i.e. computer readable instructions and data which, when executed by the processing unit 302, configure system 300 to receive, process, and output data. Instructions and data can be stored on non-transitory machine readable medium such as 310 accessible to system 300. Instructions and data may be transmitted to/received by system 300 via a data signal in a transmission channel enabled (for example) by a wired or wireless network connection over an interface such as communications interface 316.

Typically, one application accessible to system 300 will be an operating system application. In addition, system 300 will store or have access to applications which, when executed by the processing unit 302, configure system 300 to perform various computer-implemented processing operations described herein. For example, in FIG. 1 computer processing system 200 (which may be or include the hardware components of computer processing system 300) includes and executes application 204.

In some cases part or all of a given computer-implemented method will be performed by system 300 itself, while in other cases processing may be performed by other devices in data communication with system 300.

It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Figure 4:
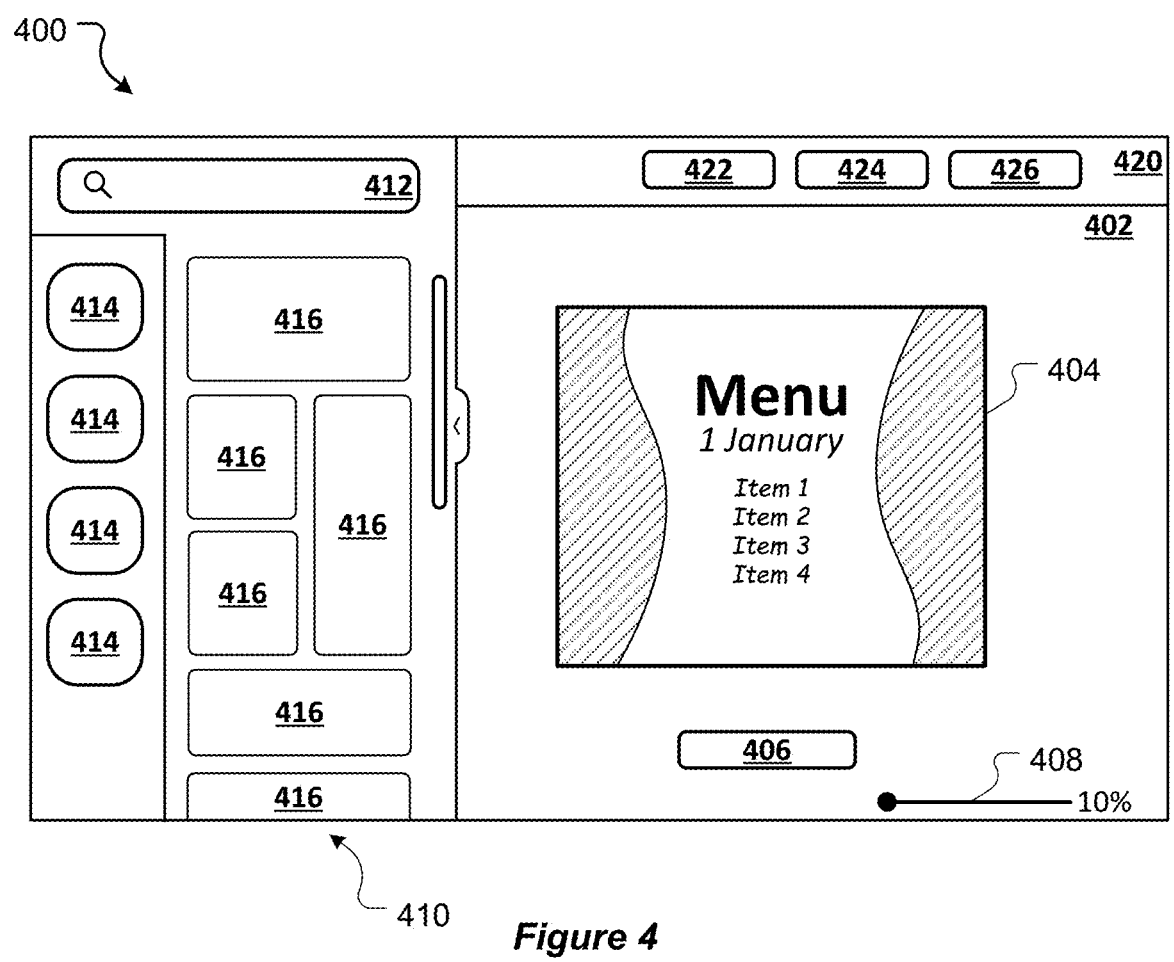
FIG. 4 depicts an example design user interface.

In the present disclosure, application 204 configures the client system to provide an editor user interface 400 (UI). Generally speaking, UI 400 will allow a user to create, edit, and output designs. FIG. 4 provides a simplified and partial example of an editor UI. In this example the editor UI 400 is a graphical user interface (GUI).

Editor UI 400 includes a design preview area 402. Design preview area 402 may, for example, be used to display a page 404 (or, in some cases multiple pages) of a design that is being created and/or edited. In this example, preview area 402 is being used to display a preview of design 120 of FIG. 1.

In this example an add page control 406 is provided (which, if activated by a user, causes a new page to be added to the design being created) and a zoom control 408 (which a user can interact with to zoom into/out of page currently displayed).

GUI 400 also includes search area 410. Search area 410 may be used, for example, to search for existing designs and/or other assets that application 204 makes available to a user to assist in creating designs. Different types of assets may be made available, for example design elements of various types (e.g. text elements, geometric shapes, charts, tables, and/or other types of design elements), media of various types (e.g. photos, vector graphics, shapes, videos, audio clips, and/or other media), design templates, design styles (e.g. defined sets of colours, font types, and/or other assets/asset parameters), and/or other assets that a user may use when creating a design.

In this example, search area 410 includes a search control 412 via which a user can submit search data (e.g. a string of characters). Search area 410 of the present example also includes several type selectors 414 which allow a user to select what they wish to search for—e.g. existing designs they have created or have access to and/or various types of design assets that application 204 may make available for a user to assist in creating or editing a design (e.g. design templates, photographs, vector graphics, audio elements, charts, tables text styles, colour schemes, and/or other assets). When a user submits a search (e.g. by selecting a particular type via a type control 414 and entering search text via search control 412) application 204 may display previews 416 (e.g. thumbnails or the like) of any search results.

Depending on implementation, the previews 416 displayed in search area 410 (and the design assets corresponding to those previews) may be accessed from various locations. For example, the search functionality invoked by search control 412 may cause application 204 to search for existing designs and/or assets that are stored in locally accessible memory of the system 202 on which application 204 executes (e.g. non-transitory memory such as 310 or other locally accessible memory), assets that are stored at a remote server (and accessed via a server application running thereon), and/or assets stored on other locally or remotely accessible devices.

GUI 400 also includes an additional controls area 420 which, in this example, is used to display additional controls. The additional controls may include one or more: permanent controls (e.g. controls such as save, download, print, share, publish, and/or other controls that are frequently used/ widely applicable and that application 204 is configured to permanently display); user configurable controls (which a user can select to add to or remove from area 420); and/or one or more adaptive controls (which application 204 may change depending, for example, on the type of design element that is currently selected/being interacted with by a user). For example, if a text element is selected, application 204 may display adaptive controls such as font style, type, size, position/justification, and/or other font related controls may be displayed. Alternatively, if a vector graphic element is selected, application 204 may display adaptive controls such as fill attributes, line attributes, transparency, and/or other vector graphic related controls may be displayed.

In the present example, UI 400 includes an identify background decorations control 422, a delete background decorations control 424, and a transfer background decorations control 426. These controls are described further below.

Once a design has been created, application 204 may provide various options for outputting that design. For example, application 204 may provide a user with options to output a design by one or more of: saving the design to local memory of system 202 (e.g. non-transitory memory 310); saving the design to remotely accessible memory device; uploading the design to a server system; printing the design to a printer (local or networked); communicating the design to another user (e.g. by email, instant message, or other electronic communication channel); publishing the design to a social media platform or other service (e.g. by sending the design to a third party server system with appropriate API commands to publish the design); and/or by other output means.

Data in respect of designs that have been (or are being) created may be stored in various formats. An example design data format that will be used throughout this disclosure for illustrative purposes will now be described. Alternative design data formats (which make use of the same or alternative design attributes) are, however, possible, and the processing described herein can be adapted for alternative formats.

In the present context, data in respect of a particular design is stored in a design record. Generally speaking, a design record defines certain design-level attributes and includes page data.

A design's page data defines (or references) one or more page records. Each page record defines a page of the design via one or more page-level attributes and element data.

In the present example, the format of each design record is a device independent format comprising a set of key-value pairs (e.g. a map or dictionary). To assist with understanding, a partial example of a design record format is as follows:

| Attribute | Example |
| --- | --- |
| Design ID | "designId": "abc123" |
| Dimensions | "dimensions": {"width": 1080, "height": 1080} |
| Design type | "type": "poster" |
| Design name | "name": "Test Doc 3" |
| Design owner | "owner": 12ab34cd |
| Edit time | "edited": "2x" |
| Page data | "pages": [{page 1}, . . . {page n}] |

In this example, the design-level attributes include: a design identifier (which uniquely identifies the design); page dimensions (e.g. a default page width and height); a design type (e.g. an indicator of the type of the design, which may be used for searching and/or sorting purposes); a design name (e.g. a string defining a default or user specified name for the design); a design owner (e.g. an identifier of a user or group that owns or created the design); a most recent edit time (e.g. a timestamp indicating when the design was last edited); and page data (discussed below). Additional and/or alternative design-level attributes may be provided, such as attributes regarding creation date, design version, design permissions, and/or other design-level attributes.

In this example, a design record's page data is a set (in this example an array) of page records, each of which defines page data in respect of a page of the design. In this example, a page record's position in a design's page array serves to identify the page and also determines its position in the design (e.g. a page at array index n appears after a page at array index n−1 and before a page at array index n+1). Page order may be alternatively handled, however, for example, by storing page order as an explicit attribute.

To assist with understanding, a partial example of a design record format is as follows:

| Attribute | Example |
| --- | --- |
| Dimensions | "dimensions": {"width": 1080, "height": 1080} |
| Background | "background": {"mediaID": "M12345"} |
| Element data | "elements": [{element 1}, . . . {element n}] |

In this example, the page-level attributes include: dimensions (e.g. a page width and height which, if present, override the default page dimensions defined by the design level dimensions attribute described above); background (data indicating any page background that has been set, for example an identifier of an image that has been set as the page background, a value (such as an RGB or other value) indicating a particular colour of a solid background fill, gradient data (e.g. a SVG gradient) defining a colour gradient, or data indicating an alternative background); and element data (discussed below). Additional and/or alternative page-level attributes may be provided, such as attributes regarding creation date, design version, design permissions, and/or other design-level attributes.

In this example, a design page's element data is a set (in this example an array) of element records. Each element record defines an element (or a set of grouped elements) that has been added to the page. In this example, an element record's position in a page's elements array serves to identify the element and also determines the depth or z-index of the element (or element group) on the page (e.g. an element at array index n is positioned above an element at array index n−1 and below an element at array index n+1). Element depth may be alternatively handled, however, for example, by storing depth as an explicit element attribute.

Generally speaking, an element record defines an object that has been added to a page—e.g. by copying and pasting, importing from one or more asset libraries (e.g. libraries of images, animations, videos, etc.), drawing/creating using one or more design tools (e.g. a text tool, a line tool, a rectangle tool, an ellipse tool, a curve tool, a freehand tool, and/or other design tools), or by otherwise being added to a design page.

Different types of design elements may be provided for depending on the system in question. By way of example, design element types such as the following may be provided: shape elements; video elements; audio elements; text elements; and/or elements of other types.

As will be appreciated, different attributes may be relevant to different element types. By way of example, an element record for a "shape" type element (that is, an element that defines a closed path and may be used to hold an image, video, text, and/or other content) may be as follows:

| Attribute | Note | E.g. |
| --- | --- | --- |
| Type | A value defining the type of the element. | "type": "Shape" |
| Position | Data defining the position of the element: e.g. an (x, y) coordinate pair defining (for example) the top left point of the element. | "position": (100, 100) |
| Size | Data defining the size of the element: e.g. a (width, height) pair. | "size": (500, 400) |
| Rotation | Data defining any rotation of the element. | "rotation": 0 |
| Opacity | Data defining any opacity of the element (or element group). | "opacity": 1 |
| Path | Data defining the path of the shape the element is in respect of. This may be a vector graphic (e.g. a scalable vector graphic) path. | "path": " . . . " |
| Media | Data indicating any media that the element holds/is used to display. This may, for example, be an image, a video, or other media. | "mediaID": "M12345" |
| Content crop | Data defining any cropping of the media (if any) the element holds/is used to display. | "mediaCrop": { . . . } |
| Text | If the element also defines text, data defining the text characters | "text": "Trip" |
| Text attributes | If the element also defines text, data defining attributes of the text. | "attributes": { . . . } |

In the above example, the shape-type element defines a shape (e.g. a circle, rectangle, triangle, star, or any other closed shape) that can hold/display a media item. Here, the value of the "media" attribute is a "mediaID" that identifies a particular media item (e.g. an image). In other examples, the value of the media attribute may be the media data itself—e.g. raster or vector image data, or other data defining content. In this particular example, the shape-type element also displays text (the word "Trip", which will be displayed atop the image defined by the media attribute).

As a further example, an element record for a text type element may be as follows:

| Key/field | Note | E.g. |
| --- | --- | --- |
| Type | A value defining the type of the element. | "type": "TEXT", |
| Position | Data defining the position of the element. | "position": (100, 100) |
| Size | Data defining the size of the element. | "size": (500, 400) |
| Rotation | Data defining any rotation of the element. | "rotation": 0 |
| Opacity | Data defining any opacity of the element. | "opacity": 1 |
| Text | Data defining the actual text characters | "text": "Trip" |
| Attributes | Data defining attributes of the text (e.g. font, font size, font style, font colour, character spacing, line spacing, justification, and/or any other relevant attributes) | "attributes": { . . . } |

In the present disclosure, an element will be referred to as defining content. The content defined by an element is the actual content that the element causes to be displayed in a design—e.g. text, an image, a video, a pattern, a colour a gradient or other content. In the present examples, the content defined by an element is defined by an attribute of that element—e.g. the "media" attribute of the example "shape" type element above and the "text" attribute of the example "text" type element above.

The storage location for design data (e.g. design records) will depend on implementation. For example, if application 204 operates as a stand-alone application design records will typically be stored on and retrieved from locally accessible memory (e.g. non-transitory memory 310). Alternatively, if application 204 is a client application that operates in conjunction with a server system, design records may (ultimately) be stored on/retrieved from data storage accessible to the server system. This would involve the client application 204 communicating design data to a server application executing at the server system which stores the data in server data storage.

In the examples described herein, a coordinate system is used in which x (horizontal) coordinates increase from left to right and y (vertical) coordinates increase from top to bottom. In this coordinate system, the position (x=0, y=0) for a given design page is the top left corner of the page. Further, the "position" attribute of a design element defines that element's origin, which in the present examples is the position of the element's top left corner (before any rotation is applied).

Certain operations described below refer to an element's bounding box. The bounding box for an element is a rectangle that fits around that element. An element's bounding can be defined by a set of four coordinates (min x, max x, min y, max y). Alternatively, an element's bounding box may be described by a set of two coordinates (e.g. min x, min y) and two values (width and height). In either case, certain operations may require the minimum and maximum x and y coordinates of an element (or its bounding box) to be determined. In the above examples, and where an element has a rotation of 0, these coordinates are as follows: min x=x coordinate of position attribute; min y=y coordinate of position attribute; max x=x coordinate of position attribute+ element width; max y=y coordinate of position attribute+ element height. If an element is rotated, however, this rotation needs to be accounted for when calculating min/ max x and y coordinates.

Certain operations described below refer to an element's corners. Reference to an element's corners should be taken as reference to the corners of an element's bounding box, which defines four corners: (min x, min y), (min x, max y), (max x, min y), (max x, max y).

Certain operations described below refer to determining whether one or more corners of an element are off-page. In the present examples, an element corner (x,y) will be off-page if any one of the following conditions is true: (x<0) or (y<0) or (x>page width) or (y>page height).

Certain operations described below refer to determining whether one or more corners of an element are on-edge. In the present examples, an element corner (x,y) will be on-edge if any one of the following conditions is true: (x=0) or (y=0) or (x=page width) or (y=page height).

In the present disclosure, and with reference to the example design format described above, two types of background decorations are described: element background decorations and non-element background decorations.

In the present disclosure, an element background decoration (element decoration for short) is a design element that is determined to be a background decoration. In the example design format described above, a design element is defined by an element record.

In contrast, a non-element background decoration (non-element decoration for short) is a decoration that is not an element (and, in the context of the example design format above, not defined by an element record). In the present examples, non-element decorations may be defined (for example) as design- or page-level attributes. For example, any page background defined by page record's "background" attribute may be considered a non-element decoration.

In alternative implementations, all background decorations may be actual design elements. For example, rather than having a page-level "background" attribute, a page background (e.g. a solid colour, a gradient, an image or other fill) may be defined by the deepest element of the page.

Figure 5:
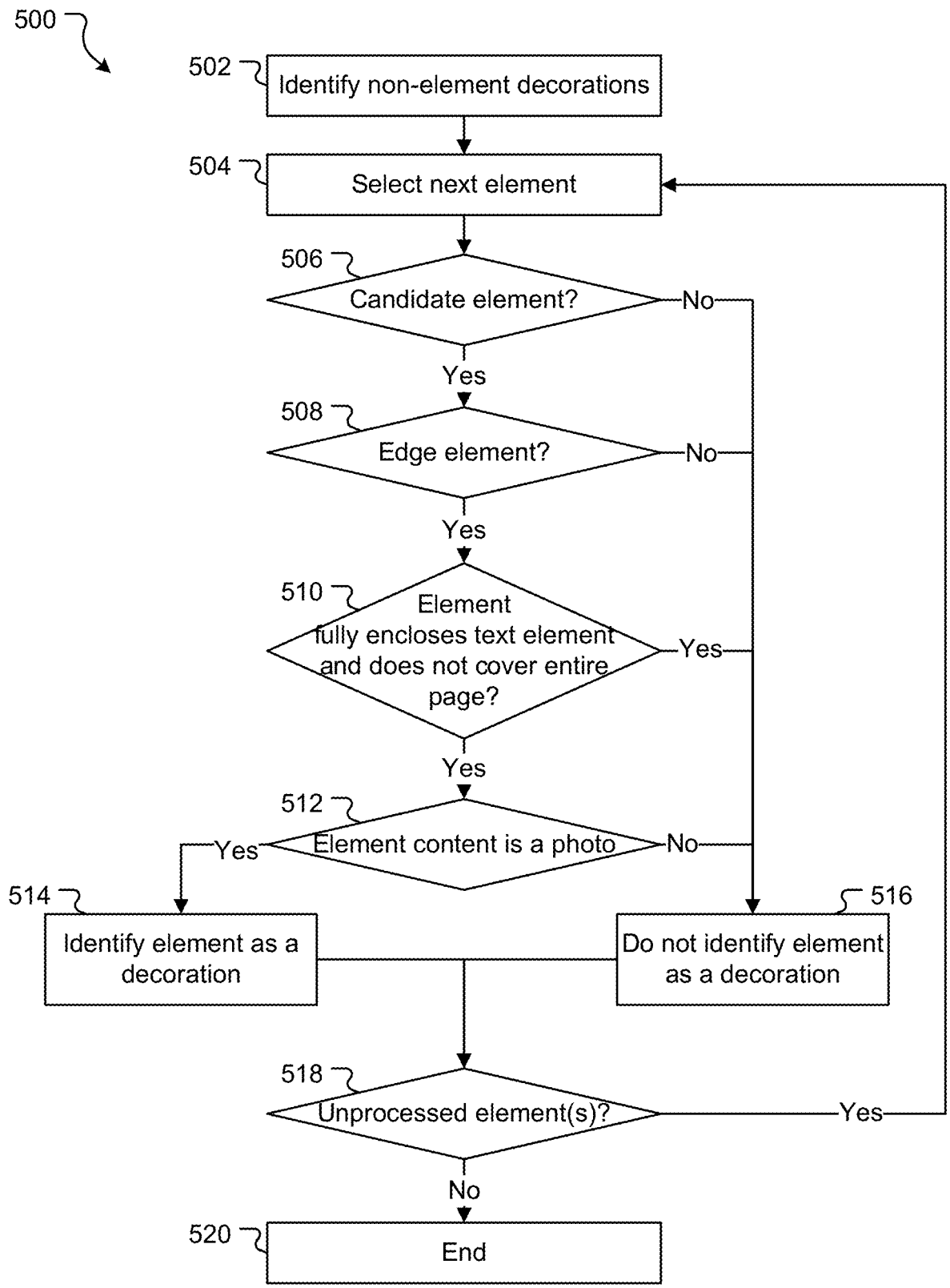
FIG. 5 depicts operations performed in a method for automatically identifying background decorations in a design.

Turning to FIG. 5, a computer implemented method 500 for automatically identifying background decorations in a subject design will be described. The operations of method 500 will be described as being performed by application 204 running on system 202.

Method 500 is performed in respect of a single design page, which will be referred to as the subject design. If a design includes multiple pages, the "subject design" of method 500 is a specific page of that multi-page design. If a multi-page design is to be processed to identify background decorations each page of the design may be processed according to method 500, either in series or in parallel.

Figure 8:
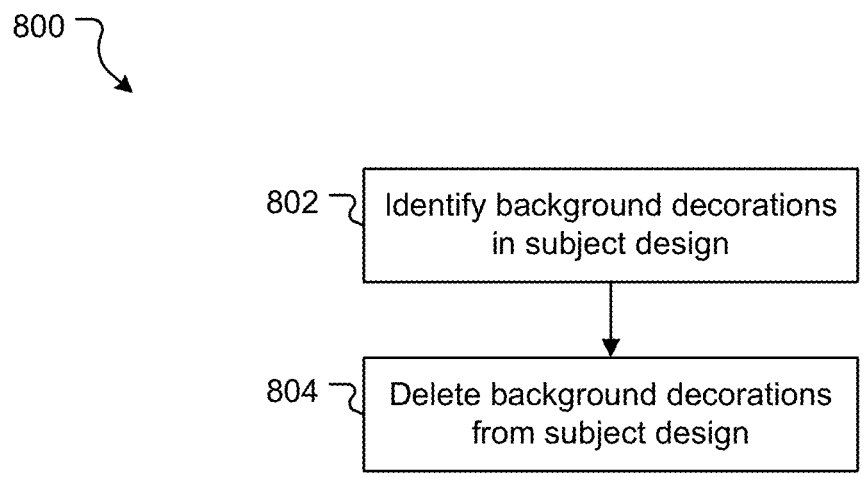
FIG. 8 depicts operations performed in a method for automatically deleting background decorations from a design.

Application 204 may perform method 500 in various contexts. For example, application 204 may perform method 500 as part of: a visual background decoration identification process (described below with reference to FIG. 6); a background decoration deletion process (described below with reference to FIG. 8); a transfer background decoration process (described below with reference to FIG. 10); and/or an alternative process.

At 502, application 204 identifies any non-element decorations of the subject design.

In the present example, and as described above, non-element decorations are defined by design- or page-level attributes (rather than by element records). In order to identify any non-element decorations application 204 is configured with a predefined set of background decoration attributes. If a design includes one of those attributes application 204 identifies that attribute as non-element decoration.

To illustrate this, and in the context of the example design format above, application 204 may be configured with a set of background decoration attributes that includes the page record "background" attribute. In this case, application 204 identifies any background defined by a page's "background" attribute (e.g. an image fill, a solid colour fill, a colour gradient fill, or an alternative background) to be a non-element decoration.

At 504, application 204 selects the next unprocessed element of the subject design. Application 204 may select elements of the subject design for processing in any order or in parallel. By way of example, in the context of the design format described above application 204 may iterate over the element records of the element data array in order.

At 506, application 204 determines if the selected element is a candidate decoration. In this context, a candidate decoration is an element that could potentially be a decoration. In the present embodiment, application 204 is configured to only consider an element to be a candidate decoration if it is a shape-type element—or, more generally, an element that is intended to be a place holder for content. In contrast, a text-type element sill not be considered a candidate decoration.

If application 204 determines that the selected element is a candidate decoration, processing proceeds to 508. If not, processing proceeds to 516 (where application 204 determines that the selected element is not a decoration).

At 508, application 204 determines if the selected element is what will be referred to as an edge element. In the present disclosure, an edge element is an element that has at least one corner (or, more specifically, at least one bounding box corner) that is positioned on our outside the page edge.

In context of the coordinate system and design format described above, a corner of an element will be on or outside the page edge if any one of the following conditions is true: (min x<=0) or (min y<=0) or (max x>=page width) or (max y>=page height).

If application 204 determines that the selected element is an edge element, processing proceeds to 510. If not, processing proceeds to 516 (where application 204 determines that the selected element is not a decoration).

At 510, application 204 determines whether the selected element fully encloses a text element but does not cover the entire page.

In the present example, the selected element will fully enclose a text element if the selected element's bounding box fully encloses a text element's bounding box In the context of the coordinate system described above, a first element (e.g. the selected element, denoted with subscript 1) will fully enclose a second element (e.g. an element with text content, denoted with subscript 2) if all of the following conditions are true: (min $x_1$<=min $x_2$) and (max $x_1$>=max $x_2$) and (min $y_1$<=min $y_2$) and (max $y_1$>=max $y_2$).

Notably, determining whether a selected element fully encloses text at 510 is not the same as determining whether the selected element itself defines text (e.g. via a content attribute of the element itself).

In context of the coordinate system described above, the selected element will cover the entire page if all of the following conditions are true: (min x<=0) and (min y<=0) and (max x>=page width) and (max y>=page height).

If application 204 determines that the selected element fully encloses a text element and does not cover the entire page, processing proceeds to 516 (where application 204 determines that the selected element is not a decoration).

If application 204 determines that the selected element does not fully enclose a text element or the selected element does fully enclose a text element but the selected element covers the entire page, processing proceeds to 512.

At 512, application 204 determines if the content of the selected element is a photo. This may be determined in various ways, for example with reference to the format of the element's content (e.g. a .jpeg and/or other formats may indicate a photo) and/or a type of the element (e.g. the design platform may provide one or more specific element types that are used to display photos). If the selected element is a photo, processing proceeds to 516 (where application 204 determines that the selected element is not a decoration). Otherwise, processing proceeds to 514 (where application 204 determines that the selected element is a decoration).

At 514, application 204 identifies the selected element as a decoration. Application 204 may be configured to perform various operations on identifying an element as a decoration. Such operations will depend on the context in which decorations are being identified. As one example, application 204 may visually identify an element decoration in a user interface (as described with reference to FIG. 6 below). As another example, application 204 may record data in respect of the element in a decorations dataset (as described with reference to FIG. 10 below). Application 204 may be configured to perform additional and/or alternative operations on determining that an element is a decoration.

Following determination that the element is a decoration (at 514) or not a decoration (at 516), processing proceeds to 518. At 518, application 204 determines whether any elements still require processing. If so, processing returns to 504. If all elements have been processed, method 520 ends (as indicated at 520).

Application 204 may be configured to make additional (and/or alternative) heuristic determinations in order to determine whether an element is a decoration. As one example, application 204 may be configured to process an element in order to determine whether it is specifically related to other elements/content of the design page being processed. If the selected element does not specifically relate to other elements/content of the design page application 204 may determine that the element is a decoration.

Figure 6:
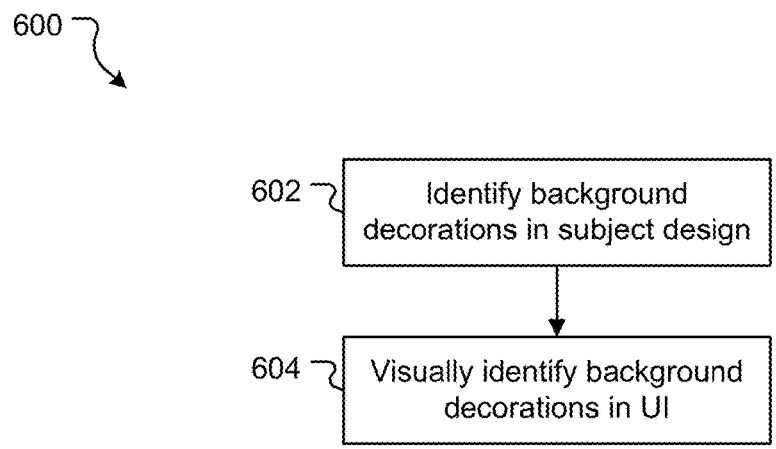
FIG. 6 depicts operations performed in a method for visually identifying background decorations in a design.

Turning to FIG. 6, a computer implemented method 600 for visually identifying background decorations in a subject design will be described. The operations of method 600 will be described as being performed by application 204 running on system 202.

Application 204 may be configured to perform method 600 in response to user input, for example user input activating a UI control such as the identify background decorations control 422 described above. In this case, the subject design may be a design page that is displayed (e.g. in preview area 402) at the time control 422 is activated. Alternatively, on activation of control 422 application 204 may display a design search interface allowing a user to search for and select a subject design.

At 602, application 204 identifies background decorations in the subject design. Application may do so, for example, according to method 500 described above or a similar method.

At 604, application 204 visually identifies the background decorations identified at 602. Application 204 may be configured to do this in various ways.

Figure 7:
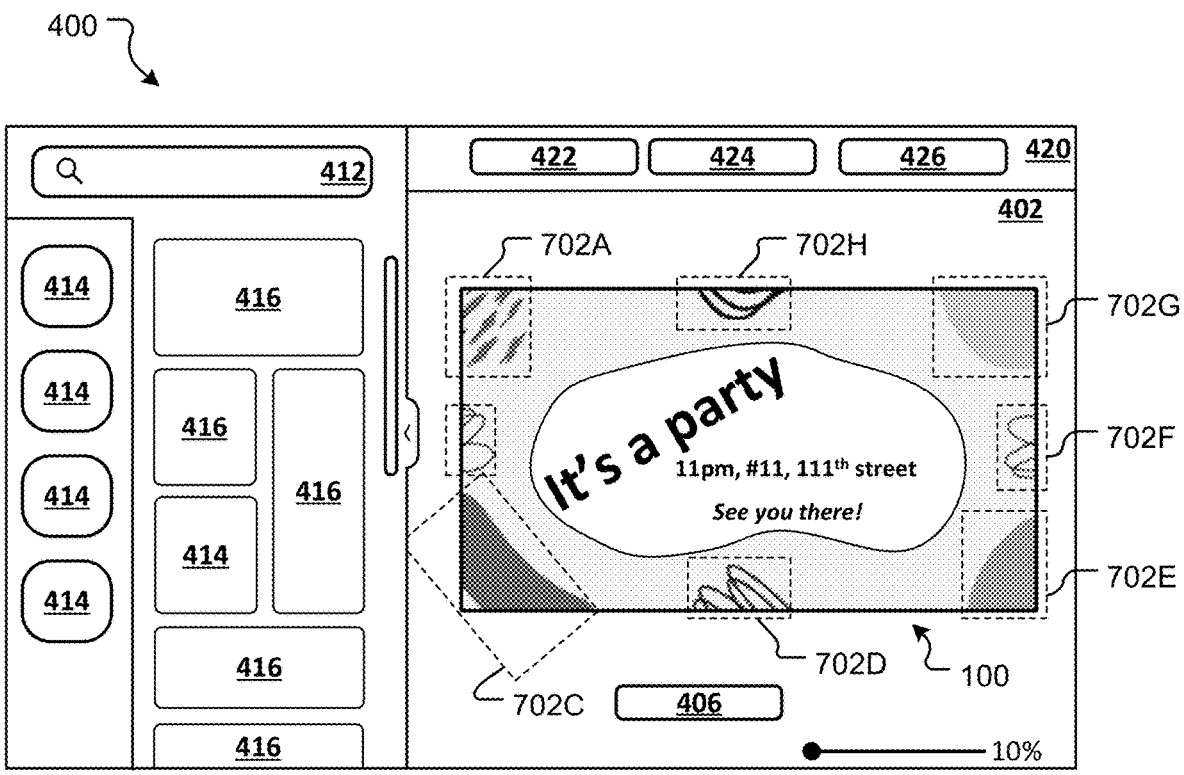
FIG. 7 depicts an example user interface which displays a design with background decorations visually identified.

In the present example, application 204 is configured to display the subject design in a user interface—e.g. in preview area 402 of example UI 400 described above. In addition, application 204 visually identifies element and/or non-element background decorations that have been identified. FIG. 7 provides one example of this.

FIG. 7 provides a version of editor UI 400 with preview area 402 used to display the example design 100 of FIG. 1. In FIG. 7, each element decoration of design 100 has been visually identified by the display of a broken-line rectangle 702 (rectangles 702A-702H corresponding to element decorations 102A-H respectively). While not shown in FIG. 7, application 204 may be configured to visually identify the non-element background decoration of design 100 (i.e. the grey background) by causing visible portions of the non-element background to flash (e.g. between white or a particular colour and the actual background colour).

Application 204 may visually identify background decorations in other ways. For example, application 204 may display decorations using different colours (partially transparent, solid, and/or flashing), different styles of bounding boxes, icons, text labels, or by using alternative techniques to visually identify background decorations.

Once background decorations have been identified, a user may perform various actions. For example, a user may take action to edit some or all of the background decorations, manually delete some or all of the background decorations, or to manually copy some or all of the background decorations (with, for example, a view to manually pasting those decorations onto another design).

As another example, background decorations may be identified as part of a delete background decorations process. Such a process may, for example, be initiated by user activation of a UI control such as Turning to FIG. 8, a computer implemented method 800 for automatically deleting background decorations in a subject design will be described. The operations of method 800 will be described as being performed by application 204 running on system 202.

Application 204 may be configured to perform method 800 in response to user input, for example user input activating a UI control such as the delete background decorations control 424 described above. In this case, the subject design may be a design page that is displayed (e.g. in preview area 402) at the time control 424 is activated. Alternatively, on activation of control 424 application 204 may display a design search interface allowing a user to search for and select a subject design.

At 802, application 204 identifies background decorations in the subject design. Application may do so, for example, according to method 500 described above or a similar method.

At 804, application 204 deletes the background decorations identified at 802.

The manner in which background decorations are deleted will depend on implementation.

In the context of the design format described above, application 204 may delete non-element decorations by deleting any design- or page-level attributes that define non-element decorations (or, alternatively, by setting a default value for such attributes). For example, to delete a page background, application 204 may delete the "background" attribute for that page or set its value to null (or a default value).

In the context of the design format described above, application 204 may delete element decorations by deleting the element records that define those decorations. For example, if the relevant page's elements array [{element record A}, {element record B}, {element record C}] and the element defined by element record B is identified as an element decoration, this can be deleted by deleting that element record from the elements array—e.g. to leave: [{element record A}, {element record C}].

Figure 9:
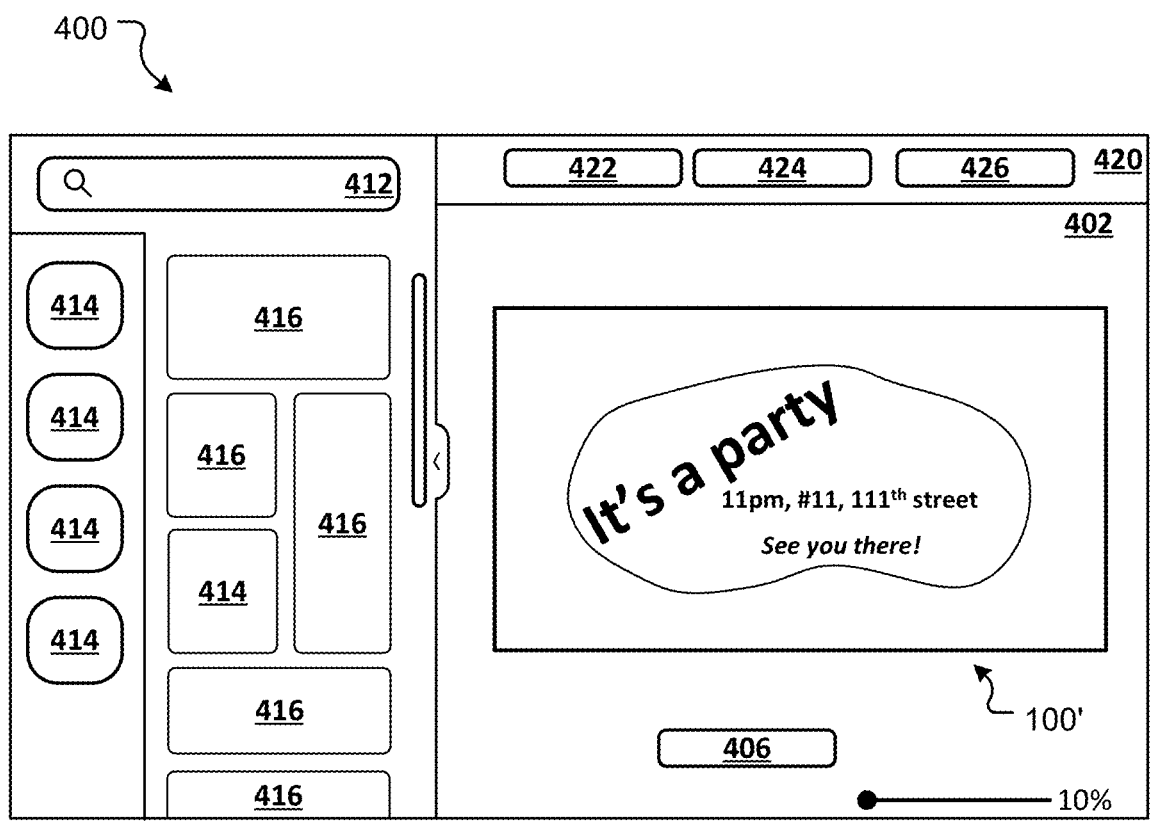
FIG. 9 depicts an example design user interface which displays a design with background decorations deleted.

To illustrate background decoration deletion, FIG. 9 provides a version of editor UI 400 in which preview area 402 displays a version 100' of example design 100 following deletion of its background decorations.

Figure 10:
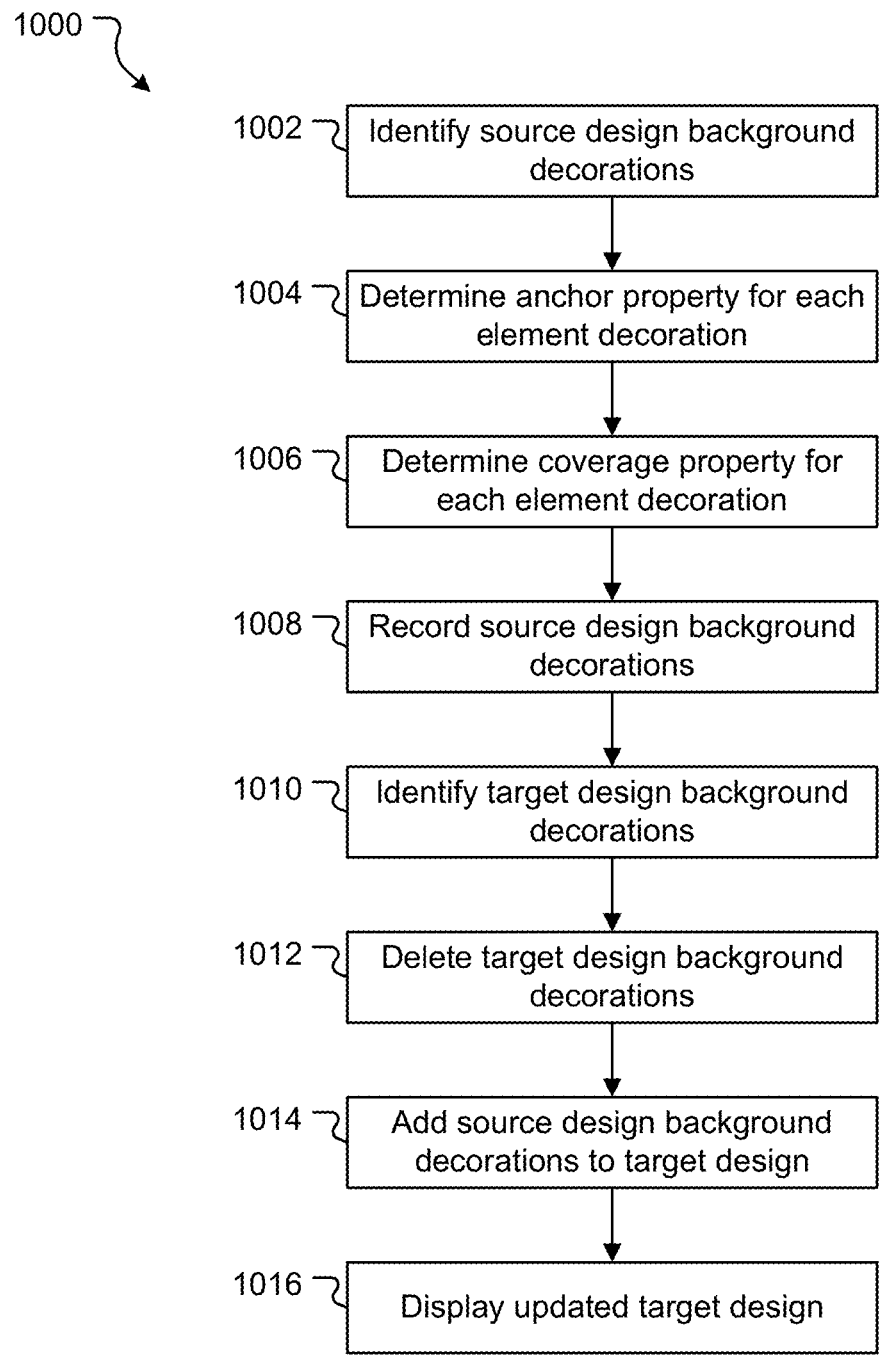
FIG. 10 depicts operations performed in a method for automatically transferring background decorations from one design to another.

Turning to FIG. 10, a computer implemented method 1000 for automatically transferring background decorations from one design (referred to as the source design) to another design (referred to as the target design) will be described. The operations of method 1000 will be described as being performed by application 204 running on system 202.

Application 204 may be configured to perform method 1000 in response to user input, for example user input activating a UI control such as the transfer background decorations control 426 described above.

In the context of method 1000, a source design is a single design page. If a design includes multiple pages, the source design is a specific page of that design.

In the context of method 1000, a target design is also single design page. If a design includes multiple pages, the target design is a specific page of that design. As noted below, however, method 1000, however, be adapted to transfer background decorations from a source design to a multi-page target design by transferring the background decorations to each page of the target design separately.

Application 204 may be configured to identify the source and target designs in various ways.

For example, application 204 may identify the source design to be a design page that is displayed (e.g. in preview area 402) at the time control 426 is activated. In this case, application 204 may display a design search interface allowing a user to search for and select a target design.

Alternatively, on activation of a control such as 426 application 204 may display a user interface (or series of user interfaces) that allow a user to search for and select both a source design and a target design.

At 1002, application 204 identifies background decorations in the source design.

In the present embodiment, application 204 automatically identifies background decorations in the source design. This may, for example, by processing the source design according to a method such as method 500 described above.

Source design background decorations may, however, be identified in alternative ways. For example, application 204 may display a preview of the source design (e.g. in a UI such as UI 400 described above) and prompt a user to select background decorations that the user wishes to transfer to the target design. In this case a user may directly select any element decorations (e.g. by clicking, contacting, or otherwise selecting those elements). Application may also display a list (or other UI control) of non-element decorations from which a user can select any non-element decorations they wish to transfer.

At 1004, application 204 determines an anchor property for each element decoration identified at 1002. The anchor property for an element decoration indicates a general position of the element decoration in the source design. As described further below, the anchor property determined for an element decoration is also used when adding the element decoration to a target design.

Application 204 determines the anchor property for an element decoration based on the element's position and, in particular, the position(s) of the element's outer corner(s). In the present context, an outer corner of an element is a corner of the element's bounding box that is either on edge or off-page (on-edge end off-page corners are described above). In the present embodiments, eight anchor property values are possible and application 204 determines the anchor property for a given element as follows.

| Application 204 determines | Anchor property | E.g. |
|---|---|---|
| Majority of element's outer corners are positioned in the top-left quadrant of the design page | Top-left | Element 102A of design 100 |
| Majority of element's outer corners are positioned in the top-right quadrant of the design page | Top-right | Element 102G of design 100 |
| Majority of element's outer corners are positioned in the bottom-left quadrant of the design page | Bottom-left | Element 102C of design 100 |
| Majority of element's outer corners are positioned in the bottom-right quadrant of the design page | Bottom-right | Element 102E of design 100 |
| Equal number of element's outer corners are positioned in the top-left and top-right quadrants of the design page | Top-center | Element 102H of design 100 |
| Equal number of element's outer corners are positioned in the bottom-left and bottom-right quadrants of the design page | Bottom-center | Element 102D of design 100 |
| Equal number of element's outer corners are positioned in the top-left and bottom-left quadrants of the design page | Centre-left | Element 102B of design 100 |
| Equal number of element's outer corners are positioned in the top-right and bottom-right quadrants of the design page | Centre-right | Element 102F of design 100 |

It will be appreciated that in implementations a different set of anchor property values may be used, for example a set of anchor property values that indicate the four quadrants only (top-left, bottom-left, top-right, bottom-right).

In the example coordinate system above, the page quadrant that an outer corner of an element (x,y) is in may be determined as follows:

| For an outer corner (x, y): if | Quadrant |
|---|---|
| (x <= (page width/2)) and (y <= (page height/2) | top-left |
| (x > (page width/2) and (y <= (page height/2) | top-right |

| For an outer corner (x, y): if | Quadrant |
|---|---|
| (x <= (page width/2)) and (y > (page height/2)) | bottom-left |
| (x > (page width/2)) and (y > (page height/2)) | bottom-right |

At 1006, application 204 determines a coverage property for each element decoration identified at 1002. As described further below, the coverage property determined for an element decoration is also used when adding the element decoration to a target design.

Application 204 determines the coverage property for an element decoration based on the page area that the element covers. In the present embodiments, four coverage property values are possible and application 204 determines the coverage property for a given element as follows:

| Application 204 determines | Coverage property |
|---|---|
| Element spans width of page (but not height) | Horizontal |
| Element spans height of page (but not width) | Vertical |
| Element spans width and height of page | All |
| Element does not span either width or height of page | None |

In the example coordinate system above, an element that has bounding box coordinates (min x, max x, min y, max y) will span the width of the page if ((min x<=0) and (max x>=page width)) and will span the height of the page if ((min y<=0) and (max y>=page height)). Element decorations 112A and 112B of design 110 provide examples of elements that application 204 would assign the 'vertical' coverage property.

At 1008, application 204 records the background decorations identified at 1002 from the source design.

Application 204 may record background decorations in various ways.

In the present example, application 204 records background decorations from a source design in a background decorations dataset.

In the present example, application 204 is configured to generate the background decorations dataset so it can be used to add decorations to a target design without having to refer back to/access the source design itself.

In this case, for a non-element decoration application 204 generates a non-element decoration record that includes the relevant attribute name and value (e.g. "background": {"mediaID": "M12345"}) and adds that record to the decorations dataset.

For an element decoration, application 204 generates an element decoration record that includes all relevant data of the element decoration and adds that record to the decorations dataset. Relevant data in respect of an element decoration will depend on implementation. By way of example, and in the context of an element record as described above, relevant data may include the type, rotation, opacity, and mediaID attributes (and the values of those attributes). To this end, the element decoration record for an element decoration may be a copy of that element decoration's original element record.

In the present embodiments, in order to retain relative depth information for element decorations, application 204 adds element decoration records to a set of records in the same order that the corresponding element records appear in the source design. To illustrate this, consider a source design defining five elements: [{E1}, {E2}, {E3}, {E4}, {E5}], three of which (E1, E4, and E5) are identified as element decorations. In this case, application 204 would add the element decoration records to the set of records as follows: [{E1}, {E4}, {E5}]. In doing so, the relative depth between the element decorations is maintained (E1 at array index 0 is behind E4 at array index 1, and E4 is behind E5 at array index 2). Application 204 may retain relative depth data in respect of element decorations in other ways (e.g. by storing an explicit z-index value for each element decoration).

In the present example, to allow the background decorations dataset to be used without reference to the source design, application 204 also records the source design width and height in the background decorations dataset.

In other implementations, application 204 may generate a set of background decorations such that adding decorations to a target design does require access the source design. For example, instead of recording actual element data in respect of decoration elements, application 204 may instead record an element identifier that allows the element data to be retrieved from the source design. In the context of the design format described above, an element may be identified by a (page identifier, element identifier) tuple, where the page identifier is the relevant page record's index in the pages array and the element identifier is the relevant element record's index in the page's elements array.

At 1010, application 204 identifies background decorations in the target design.

In the present embodiment, application 204 automatically identifies background decorations in the target design. This may, for example, by processing the target design according to a method such as method 500 described above.

Target design background decorations may, however, be identified in alternative ways. For example, application 204 may display a preview of the target design (e.g. in a UI such as UI 400 described above) and prompt a user to select background decorations that the user wishes to delete from the target design.

At 1012, application 204 deletes the target design background elements identified at 1010. Deletion of background decorations is described above with reference to 804 of method 800.

At 1014, application 204 adds the source design background decorations (as recorded at 1008) to the target design. An example method for adding background decorations to a target design is described with reference to FIG. 11.

Following 1014, the background decorations have been added to the target design. In the present example, application 204 is further configured to display the updated target design (i.e. the target design with original background decorations deleted as per 1012 and new background decorations added as per 1014) at 1016. Application 204 may, for example, display the updated target design in a preview area such as area 402 of UI 400 described above. For example, if the source design was design 100 of FIG. 1 and the target design was design 110 of FIG. 1, then application 204 would display updated target design 120 of FIG. 1 at 1016.

When displaying an updated target design at 1016, application 204 may also display one or more of: an "undo all" control (on activation of which application 204 reverts the target design to its original form); an "undo background decoration deletion" control (on activation of which application 204 adds the background decorations that were deleted from the target design at 1012 back into the target design); an "undo background decoration addition" control (on activation of which application 204 removes the new background decorations that were added to the design at 1014); and an "identify new background decorations" control (on activation of which application 204 visually identifies the background decorations that were added at 1014, for example as described with reference to FIGS. 6 and 7 above).

In certain embodiments, application 204 may persistently store background decoration datasets that it generates at 1008. Furthermore, application 204 may be configured to make background decoration datasets available to a user as "background decoration set" assets. This is described further below with reference to FIG. 12. To this end, application 204 may save background decoration datasets to locally accessible memory (e.g. non-transitory memory 310), and/or may upload background decoration datasets to a server environment which can then provide the datasets to other client applications.

In the present example, determining a decoration element's anchor property and coverage property and recording decorations are described as operations that are performed separately to the actual identification of decorations. Where decorations are automatically identified via a method such as 500 described above, however, application 204 may be configured to perform one more of these operations when a decoration is identified. For example, application 204 may be configured to determine an element decoration's anchor and coverage properties (as described at 1004 and 1006) and then record the element decoration (e.g. by generating/saving a decoration record as described at 1008) following identification of an element as an element decoration (e.g. at 514). Similarly, application 204 may record a non-element decoration (e.g. by generating/saving a decoration record as described at 1008) following identification of that non-element decoration (e.g. following 502).

Figure 11:
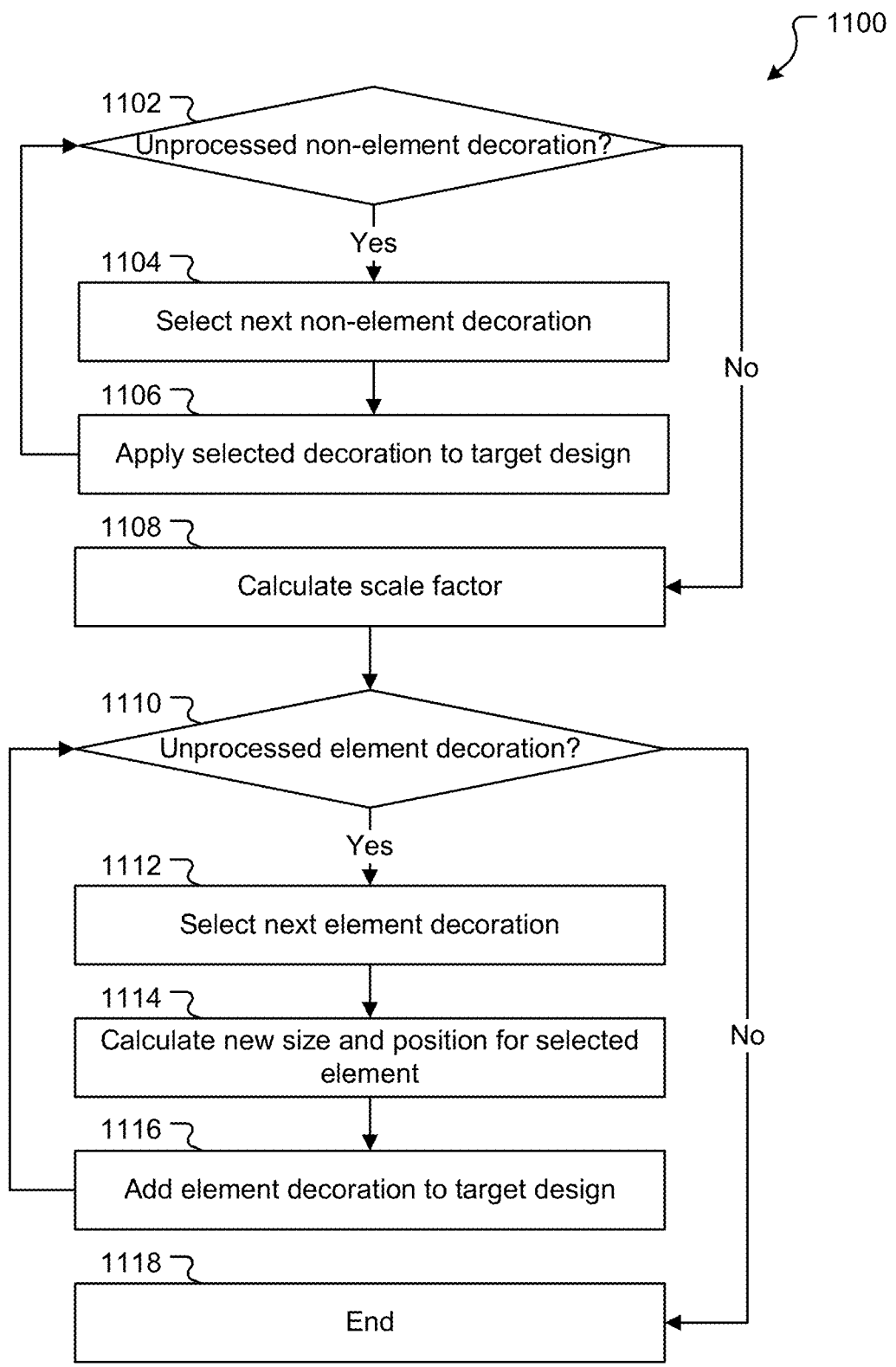
FIG. 11 depicts operations performed in a method for adding background decorations to a target design.

Turning to FIG. 11, a computer implemented method 1100 for adding background decorations to a target design will be described. The operations of method 1000 will be described as being performed by application 204 running on system 202.

In the present example, application 204 performs method 1100 at 1014 of method 1000. Application 204 may, however, be configured to perform method 1100 in other contexts.

Generally speaking, method 1100 takes as input (or involves accessing) a target design, a set of background decorations, and source design size data (e.g. a height and a width of the source design that the background decorations were originally defined in). The set of background decorations may be defined by a background decorations dataset as described above with reference to 1008. This dataset may include the source design size data.

Generally speaking, method 1100 operates to add any non-element decorations that are defined to the target design (1102-1104) and then add any element decorations that are defined to the target design (1106-1116). Element and non-element decorations could, however, be added to the target design in a different order (or in parallel). Accordingly, while method 1100 is depicted and defined as a single continuous process, method 1100 could be considered as two separate process—e.g. an add non-element decorations process (which includes operations 1102-1104) and an add element decorations process (which includes operations 1108-1116).

At 1102, application 204 determines whether the background decorations set defines any non-element decorations that have not yet been added to the target design. If so, processing proceeds to 1104. If not, processing proceeds to 1106.

At 1104, application 204 selects the next unprocessed non-element decoration from the background decorations set. Application 204 may select non-element decorations from the background decorations set in any order.

At 1106, application 204 adds the selected non-element decoration to the target design. For example, if the background decorations being added include a particular page background, application 204 sets the page background of the target design to that particular page background.

In the context of the design format described above, a non-element decoration is added to a target design by adding the appropriate attribute to the target design (or, if the target design already defines a value for that attribute, overwriting that value). For example, if the set of background decorations includes a decoration record such as {"background": {"mediaID": "M12345"} }, this is added to the target design by adding this attribute to the relevant page record of the target design (or, if the target design already includes a "background" attribute in the relevant page record, overwriting the value of that attribute to "M12345").

Once the selected non-element decoration has been added to the target design processing returns to 1102.

At 1108, application 204 calculates a scale factor. As described below, the scale factor is used to calculate a new size and position for each element decoration that is added to the target design. The scale factor represents a ratio between the size of the source design (e.g. as defined by the width and height of the source design page) and the size of the target design (e.g. as defined by the width and height of the target design page).

In the present embodiments, and application 204 calculates the scale factor by calculating a width factor (width factor=source design width/target design width) and a height factor (height factor=source design height/target design height) and selecting the factor that is closest to one. To illustrate this, consider a (1920×1080 px) source design and a (940×788 px) target design. In this case, the width factor is (1920/940=2.04) and the height factor is (1080/788=1.37). In this case application 204 determines 1.37 to be the scale factor as it is closest to 1.

At 1110, application 204 determines whether the background decorations set defines any element decorations that have not yet been added to the target design. If so, processing proceeds to 1112. If not, all background decorations have been added to the target design and method 1100 ends (as indicated at 1120).

At 1112, application 204 selects the next unprocessed element decoration from the background decorations set. Application 204 may be configured to select element decorations from the background decorations set in any order. That said, when adding new element decorations to the target design, depth (z-index) will need to be taken into account. This is discussed further below. In the present embodiment, therefore, application 204 selects element decorations from the background decorations set in order of shallowest element decoration (highest z-index) to deepest element decoration (lowest z-index).

At 1116, application 204 calculates a new size and a new position for the element decoration selected at 1112. These are the size and the position that the element decoration will have in the target design.

In the present embodiments, the new size and position for an element decoration are calculated according to the algorithm described below which computes a target_box that contains the decoration in the space of the target page:

Definitions box: a top left position (x, y) and dimensions (width, height)

Inputs:
source_box:=the box of the selected element decoration
decoration_anchor:=the anchor property of the selected element decoration
cover:=the cover property of the selected element decoration
scale_factor:=as calculated at 1108
target_space:=the space of the target, e.g. the width and height of the target_page
source_page:=the box representing the source page of the selected element decoration
(e.g. (x=0, y-0, width=source page width, height=source page height))
target_page:=the page we are applying the decoration to
target_anchor_location:=a representation of the source_anchor_location, in target_space Output:
target_box:=the target box to fit the element decoration into, to apply to the target_page If cover is NONE:
  Find the target_anchor_location:
    using v:=source_box.top_left−(decoration_anchor as point on source page)
    target_anchor_location:=v*scale_factor+(decoration_anchor as point on target page)
    target_box:=source_box, translated by target_anchor_location-source_box.top_left, scaled by scale_factor if cover is ALL:
  Find the target_anchor_location:
    using v:=source_box.top_left-source_page.top_left
    target_anchor_location:=v*scale_factor
    target_box:=
      source_box, translated by target_anchor_location-source_box.top_left,
      then scaled around target_anchor_location until covering entire target_page If cover is HORIZONTAL:
  if anchor is TOP_CENTER:
    Find the target_anchor_location:
      using v:=source_box.bottom_left-source_page.top_left
      target_anchor_location:=v*scale_factor+target_page.top_left
      target_box:=
        source_box, translated by target_anchor_location-source_box.bottom_left,
        then scaled around target_anchor_location until:
          width covers target_page. width, and height reaches top of target_page
  if anchor is BOTTOM_CENTER:
    Find the target_anchor_location:
      using v:=source_box.top_left-source_page.bottom_left
      target_anchor_location:=v*scale_factor+target_page.bottom_left
      target_box:=
        source_box, translated by target_anchor_location-source_box.top_left,
        then scaled around target_anchor_location until:
          width covers target_page.width, and height reaches bottom of target_page If cover is VERTICAL:
  if anchor is CENTER_LEFT:
    Find the target_anchor_location:
      using v:=source_box.top_right-source_page.top_left
      target_anchor_location:=v*scale_factor+target_page.top_left
      target_box:=
        source_box, translated by target_anchor_location-source_box.top_right,
        then scaled around target_anchor_location until:
          height covers target_page.height, and width reaches left of target_page
  if anchor is CENTER_RIGHT:
    Find the target_anchor_location:
      using v:=source_box.top_left-source_page.top_right
      target_anchor_location:=v*scale_factor+target_page.top_right
      target_box:=
        source_box, translated by target_anchor_location-source_box.top_left,
        then scaled around target_anchor_location until:
          height covers target_page.height, and width reaches right of target_page If other combination of anchor/cover:
  skip decoration.

At 1116, application 204 adds the element decoration to the target design (unless the output of the algorithm above indicates that the element decoration should be skipped).

In the context of the design format described above, application 204 adds the element decoration to the target design by generating an element record for the decoration and adding that element record to the elements array of the relevant page record.

Application 204 generates the new element record based on relevant data in respect of the element decoration as originally defined in the source design and the new size and position calculated at 1116. In the present example, the relevant data in respect of the element decoration as originally defined in the source design includes the element's original type, rotation, opacity, and image/fill (e.g. the "mediaID" attribute in the example element record format described above). In certain implementations, this data may be included in the decoration record itself. In other implementations, some or all of the relevant data may need to be retrieved from the source design (using, for example, an element identifier included in the decoration record).

When adding a new element decoration to the target design consideration of the element's depth (or z-index) is required.

In the present embodiments, application 204 is configured to add element decorations to the target design so that a) the relative depths that the element decorations had in the original source design are maintained (e.g. so that if a first element decoration was deeper/behind second decoration in the original source design then the first element decoration is deeper/behind the second decoration when they are added to the target design) and b) all element decorations that are added to the target design are deeper than (behind) any existing elements of the target design.

In the present example, application 204 achieves this by: selecting element decorations from the background decorations set (at 1112) in reverse depth order (i.e. from the record defining the shallowest element decoration (e.g. highest z-index) to the record defining the deepest element decoration (e.g. lowest z-index)); and adding each element decoration to the target design (at 1116) so that it is deepest current element of the target design. In the context of the example design format described above, a new element can be added to a page as the deepest element by prepending the element record for the new element to the page's element array.

To illustrate this, consider a target design which has two existing elements defined by an elements array such as [{Existing element 1}, {Existing element 2} ] and a background decorations set that defines two element decorations: [{Element decoration 1}, {Element decoration 2}]. In this example it is assumed that the element decorations defined in the background decorations set are defined in depth order so that "Element decoration 1" at index 0 is deeper than/behind "Element decoration 2" which is at array index 1. To add these element decorations to the target design, application 204 would initially select the shallowest element decoration at 1112 (here "Element decoration 2") and add the element to the target design at 1116 by prepending it to the target design's elements array. This would provide a target design element array of [{Element decoration 2}, {Existing element 1}, {Existing element 2} ]. Application 204 would then select the next shallowest element decoration at 1110 (here "Element decoration 1") and add it to the target design at 1118 by prepending it to the target design's elements array. This would provide a target design element array of [{Element decoration 1}, {Element decoration 2}, {Existing element 1}, {Existing element 2}].

Application 204 may, however, be configured to take depth into account when adding element decorations to the target design in different ways.

Once application 204 has added the element decoration to the design, processing returns to 1110 to determine whether any further element decorations need to be added.

When adding element decorations to a target design, application 204 may be configured to initially determine whether the size and aspect ratio of the source design and target design are the same. If they are the same, application 204 may be configured to add the element decorations to the target design using their original sizes and positions (i.e. without calculating new element sizes and positions at 1114).

As noted above, in certain embodiments, application 204 may be configured to persistently store background decoration datasets that it generates at 1008.

Further, application 204 may be configured to make background decoration datasets available to a user as "background decoration set" assets. This is described further below with reference to FIG. 12.

Figure 12:
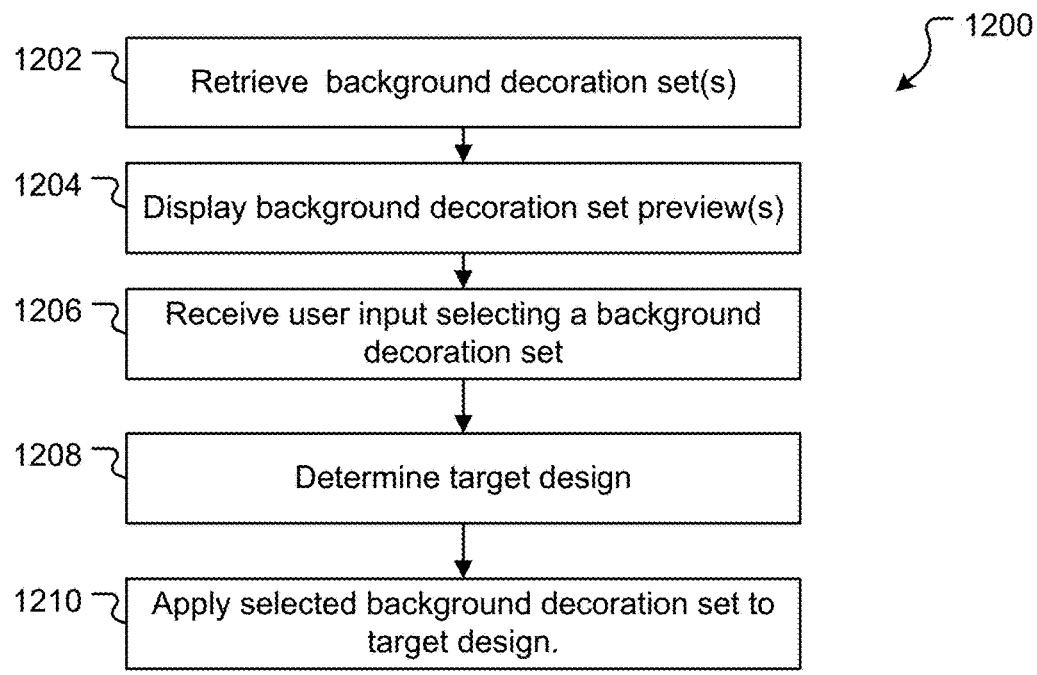
FIG. 12 depicts operations performed in a method for applying a background decorations dataset to a target design.

FIG. 12 depicts operations performed in a method 1200 for applying a background decorations set (referred to as a decoration set for short) to a target design.

At 1202, application 204 retrieves one or more decoration sets. Application 204 may, for example, retrieve decoration sets in response to user input.

Figure 13:
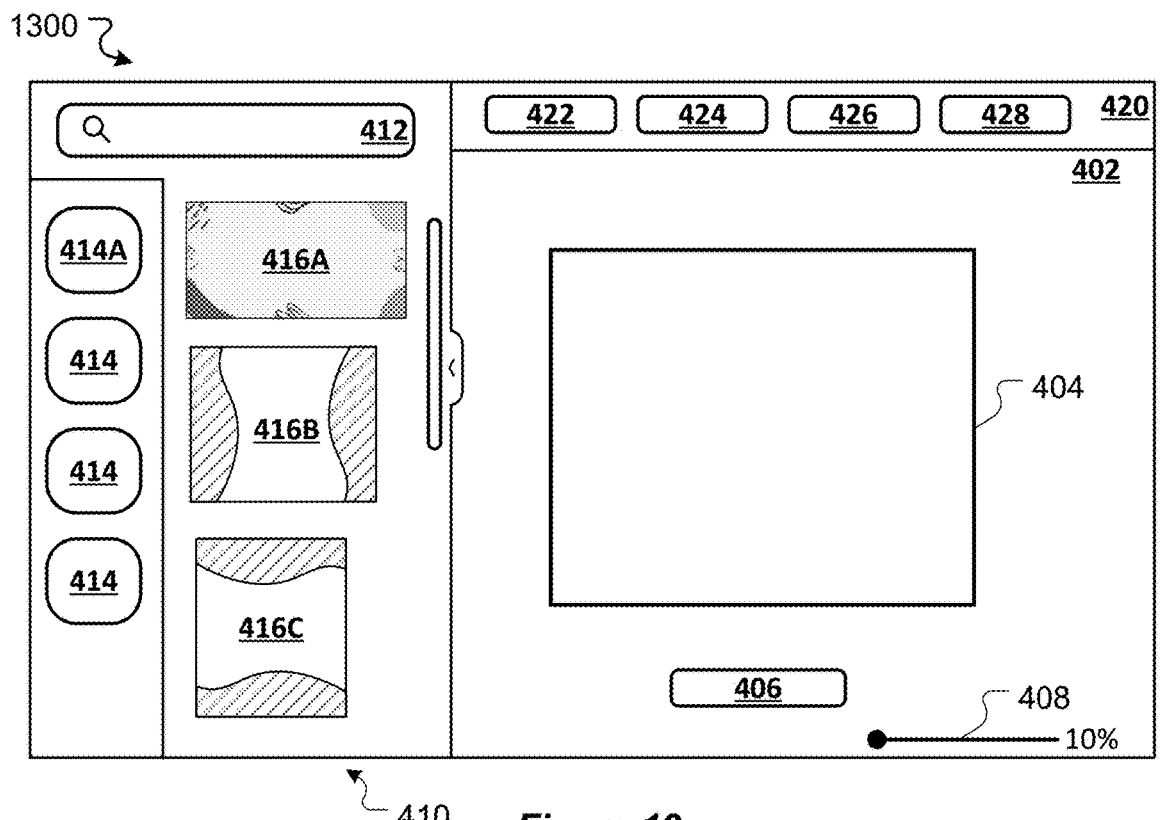
FIG. 13 depicts an example design user interface.

As one example, FIG. 13 depicts a UI 1300 that is a version of UI 400 described above. In this example, application 204 provides a mechanism for users to search or browse through available decoration sets. In particular, a user may select decoration sets as the asset type they wish to search for via type selector control 414A. In response, application 204 retrieves decoration sets that are available (from either locally accessible memory or a server environment). In some instances, decoration sets may be associated with one or more search keywords. In this case, a user may enter a search string in search control 412 and application 204 may retrieve decoration sets based on the search string.

At 1204, application 204 displays preview(s) of the decoration set(s) retrieved at 1202.

In example UI 1300, decoration set previews 416 are displayed in search area 410. In this particular example, three decoration sets have been identified and previews 416C, 416B, 416C of those decoration sets are displayed. In this example, each decoration set preview includes a preview of the set's element and non-element decorations.

At 1206, application 204 receives user input selecting a particular decoration set. In the present example this is input selecting (e.g. by clicking on or contacting) the preview of the particular decoration set. Alternative user inputs to select a decoration set are possible.

At 1208, application 204 determines a target design. Application 204 may be configured to determine the target design in various ways. For example, application 204 may identify the target design as a design page that is displayed (e.g. in preview area 402) at the time the decoration set is selected. Alternatively, application 204 may display a user interface (or series of user interfaces) that allow a user to search for and select a target design.

In some instances, application 204 may be configured to permit a user to drag a decoration set preview 416 onto the desired target design 404. In this case the drag input serves to both select the particular background decoration set (via its preview) and the particular target design (the page that the preview is dragged to).

At 1210, application 204 applies the selected decoration set to the target design. This may, for example, be in accordance with a method such as method 1100 described above.

In this case a user need not actually see the source designs from which the background decoration set assets were originally extracted. Further, if background decoration datasets are generated so they can be used without reference to the original source designs (as described above), no further reference to the original source design is required to apply a background decoration set to a new design.

In the methods described above, application 204 is configured to identify (per method 500), visually identify (per method 600), delete (per method 800) and/or transfer (per method 1000) both element and non-element background decorations. In alternative embodiments, these methods may be adapted so that that only element background decorations are identified/visually identified/deleted/transferred and no action is taken to identify/visually identify/delete/transfer non-element decorations.

The following first set of numbered clauses describes additional, specific embodiments of the disclosure:

Clause 1. A computer implemented method for automatically adding elements to a target design, the method including:
  identifying one or more source design (SD) element decorations, each SD element decoration corresponding to a design element that was originally defined in a source design; and
  adding each SD element decoration to the target design, wherein adding a selected SD element decoration to the target design includes:
  calculating a new position for the selected SD element decoration, the new position for the selected SD element decoration based on an original position of the selected SD element decoration in the source design;
  calculating a new size for the selected SD element decoration, the new size for the selected SD element decoration based on an original size of the selected SD element decoration in the source design; and adding the selected SD element decoration to the target design using the new size and the new position.

Clause 2. The computer implemented method of clause 1, wherein the new position for the selected SD element decoration is calculated based on an anchor property associated with the selected SD element decoration, the anchor property having a value that indicates a general position of the selected SD element decoration in the source design.

Clause 3. The computer implemented method of clause 2, wherein the anchor property has a value that indicates a general position selected from a group including: a top-left position; a top-right position; a bottom-left position; a bottom-right position.

Clause 4. The computer implemented method of clause 2, wherein the anchor property has a value that indicates a general position selected from a group including: a top-left position; a top-right position; a bottom-left position; a bottom-right position; a top-center position; a bottom-center position; a centre-left position; and a centre-right position.

Clause 5. The computer implemented method of any preceding clause, wherein the new position for the selected SD element decoration is calculated based on a coverage property associated with the selected SD element decoration, the coverage property having a value that indicates an extent of the source design covered by the selected SD element decoration.

Clause 6. The computer implemented method of clause 5, wherein the coverage property has a value selected from a group including: a value indicating that the selected SD element covered a width of the source design; a value indicating that the selected SD element covered a height of the source design; a value indicating that the selected SD element covered both a width and a height of the source design.

Clause 7. The computer implemented method of any preceding clause, further including:
identifying a source design (SD) non-element decoration, the SD non-element decoration defined by a design- or page-level attribute of the source design; and
adding the SD non-element decoration to the target design.

Clause 8. The computer implemented method of clause 7, wherein the SD non-element decoration is defined by a background attribute of the source design.

Clause 9. The computer implemented method of any preceding clause, further including: processing the target design to automatically identify one or more target design (TD) element decorations; and deleting each TD decoration from the target design.

Clause 10. The computer implemented method of any preceding clause, further including:
processing the target design to automatically identify a target design (TD) non-element decoration, the TD non-element decoration defined by a design- or page-level attribute of the target design; and
deleting the TD non-element decoration from the target design.

Clause 11. The computer implemented method of any preceding clause, wherein identifying the one or more SD element decorations includes processing the source design to automatically identify the one or more SD element decorations.

Clause 12. The computer implemented method of clause 11, wherein processing the source design to automatically identify the one or more SD element decorations includes:
determining whether a first element of the source design is an element decoration or not based on one or more of: a type of the first elected element; content of the first element; a position of the first element; and a size of the first element.

Clause 13. The computer implemented method of clause 11, wherein processing the source design to automatically identify the one or more SD element decorations includes:
processing a first element of the source design; and
identifying that the first element is not an element decoration based on a determination that the first element defines text content.

Clause 14. The computer implemented method of clause 11, wherein processing the source design to automatically identify the one or more SD element decorations includes:
processing a first element of the source design; and
identifying that the first element of the source design is not an element decoration based on a determination that the first element is not an edge element.

Clause 15. The computer implemented method of clause 11 wherein processing the source design to automatically identify the one or more SD element decorations further includes:
processing a first element of the source design; and
identifying that the first element of the source design is not an element decoration based on a determination that:
the first element is an edge element;
the first element encloses at least one other element that defines text content; and
the first element does not cover an entire page.

Clause 16. The computer implemented method of clause 11 wherein processing the source design to automatically identify the one or more SD element decorations includes:
processing a first element of the source design; and
identifying that the first element of the source design is an element decoration based on a determination that:
the first element is an edge element; and
the first element does not enclose any other elements that define text content.

Clause 17. The computer implemented method of clause 11 wherein processing the source design to automatically identify the one or more SD element decorations further includes:
processing a first element of the source design; and
identifying that the first element of the source design is an element decoration based on a determination that:
the first element is an edge element;
the first element covers an entire page.

Clause 18. The computer implemented method of clause 16 or clause 17, wherein identifying that the first element of the source design is an element decoration is further based on a determination that the first element is a candidate element.

Clause 19. The computer implemented method of clause 18, wherein determining that the first element is a candidate element includes determining that the candidate first element is a shape type element that defines a shape that can be used to hold content.

Clause 20. The computer implemented method of any one of clauses 15 to 17, wherein the first element is an edge element if one or more corners of the first element is positioned on or outside of a page edge.

Clause 21. A computer processing system including:
 a processing unit; and
 a non-transitory computer-readable storage medium storing instructions, which when executed by the processing unit, cause the processing unit to perform a method according to any one of clauses 1 to 20.

Clause 22. A non-transitory storage medium storing instructions executable by processing unit to cause the processing unit to perform a method according to any one of clauses 1 to 20.

The following second set of numbered clauses describes additional, specific embodiments of the disclosure:

Clause 1. A computer implemented method including:
 processing a first design to identify one or more element decorations, each element decoration corresponding to a design element defined by the first design; and
 recording each element decoration in a decorations set.

Clause 2. The computer implemented method of clause 1, wherein processing the first design to identify the one or more element decorations includes:
 determining whether a first element of the first design is an element decoration or not based on one or more of: a type of the first elected element; content of the first element; a position of the first element; and a size of the first element.

Clause 3. The computer implemented method of clause 1, wherein processing the first design to identify the one or more element decorations includes:
 processing a first element of the first design; and
 identifying that the first element is not an element decoration based on a determination that the first element defines text content.

Clause 4. The computer implemented method of clause 1, wherein processing the first design to identify the one or more element decorations includes:
 processing a first element of the first design; and
 identifying that the first element of the first design is not an element decoration based on a determination that the first element is not an edge element.

Clause 5. The computer implemented method of clause 1, wherein processing the first design to identify the one or more element decorations further includes:
 processing a first element of the first design; and
 identifying that the first element of the first design is not an element decoration based on a determination that:
  the first element is an edge element;
  the first element encloses at least one other element of the first design that defines text content; and
  the first element does not cover an entire page.

Clause 6. The computer implemented method of clause 1, wherein processing the first design to identify the one or more element decorations includes:
 processing a first element of the first design; and
 identifying that the first element of the first design is an element decoration based on a determination that:
  the first element is an edge element; and
  the first element does not enclose any other elements of the first design that define text content.

Clause 7. The computer implemented method of clause 1, wherein processing the first design to identify the one or more element decorations further includes:
 processing a first element of the first design; and
 identifying that the first element of the first design is an element decoration based on a determination that:
  the first element is an edge element;
  the first element covers an entire page.

Clause 8. The computer implemented method of clause 6 or clause 7, wherein identifying that the first element of the first design is an element decoration is further based on a determination that the first element is a candidate element.

Clause 9. The computer implemented method of clause 8, wherein determining that the first element is a candidate element includes determining that the first element is a shape type element that defines a shape that can be used to hold content.

Clause 10. The computer implemented method of any one of clauses 5 to 7, wherein the first element is an edge element if one or more corners of the first element is positioned on or outside of a page edge.

Clause 11. The computer implemented method of any one of clauses 1 to 10, wherein recording an element decoration in the decorations set includes, for each element decoration:
 determining an anchor property for the element decoration, the anchor property being a value that indicates a general position of the element decoration in the first design; and
 recording the anchor property for the element decoration in the decorations set.

Clause 12. The computer implemented method of clause 11, wherein the anchor property has a value that indicates a general position selected from a group including: a top-left position; a top-right position; a bottom-left position; a bottom-right position.

Clause 13. The computer implemented method of clause 11 or clause 12, wherein the anchor property has a value that indicates a general position selected from a group including: a top-left position; a top-right position; a bottom-left position; a bottom-right position; a top-center position; a bottom-center position; a centre-left position; and a centre-right position.

Clause 14. The computer implemented method of any one of clauses 1 to 13, wherein recording an element decoration in the decorations set includes, for each element decoration:
 determining a coverage property for the element decoration, the coverage property being a value that indicates an extent of the first design covered by the element decoration; and recording the cover property for the element decoration in the decorations set.

Clause 15. The computer implemented method of clause 14, wherein the coverage property has a value selected from a group including: a value indicating that the element decoration covered a width of the first design; a value indicating that the element decoration covered a height of the first design; a value indicating that the element decoration covered both a width and a height of the first design.

Clause 16. The computer implemented method of any one of clauses 1 to 15, further including recording a height of the first design and a width of the first design in the decorations set.

Clause 17. The computer implemented method of any one of clauses 1 to 16, further including:
 processing the first design to identify one or more non-element decorations, each non-element decoration defined by a design- or page-level attribute of the first design; and recording each non-element decoration in the decorations set.

Clause 18. The computer implemented method of clause 17, wherein processing the first design to identify one or more non-element decorations includes identifying a first non-element decoration, the first non-element decoration being defined by a background attribute of the first design.

Clause 19. The computer implemented method of any one of clauses 1 to 18, further including:
displaying a user interface including a decorations set preview, the decorations set preview including a preview of at least one element decoration.

Clause 20. The computer implemented method of clause 19, wherein the decorations set preview includes a preview of each of the at least one element decorations.

Clause 21. The computer implemented method of clause 19 or clause 20 when dependent on clause 17 or clause 18, wherein the decorations set preview includes preview of at least one non-element decoration.

Clause 22. The computer implemented method of clause 21, wherein the decorations set preview includes a preview of each of the at least one non-element decorations.

Clause 23. The computer implemented method of any one of clauses 1 to 22, further including: receiving user input selecting the decoration set preview; and in response to receiving the user input selecting the decoration set preview, applying the decoration set to a target design.

Clause 24. A computer processing system including:
a processing unit; and
a non-transitory computer-readable storage medium storing instructions, which when executed by the processing unit, cause the processing unit to perform a method according to any one of clauses 1 to 23.

Clause 25. A non-transitory storage medium storing instructions executable by processing unit to cause the processing unit to perform a method according to any one of clauses 1 to 23.

The operations of methods 500, 600, 800, 1000, 1100, and 1200 have been described as being performed by application 204 running on system 202. In alternative embodiments, however, the processing described may be performed by one or more alternative applications running on one or more alternative computer processing systems.

Where application 204 is described as displaying user interfaces (or user interface elements such as controls and other UI objects), application 204 does so via one or more displays—e.g. display 318. Where application 204 operates to receive or detect user input, such input is provided via one or more input devices—e.g. a touch screen, a touch screen display 318, a cursor control device 324, a keyboard 326, and/or an alternative input device.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

In some instances the present disclosure may use the terms "first," "second," etc. to identify and distinguish between elements or features. When used in this way, these terms are not used in an ordinal sense and are not intended to imply any particular order. For example, a first user input could be termed a second user input or vice versa without departing from the scope of the described examples. Furthermore, when used to differentiate elements or features, a second user input could exist without a first user input or a second user input could occur before a first user input.

Background information described in this specification is background information known to the inventors. Reference to this information as background information is not an acknowledgment or suggestion that this background information is prior art or is common general knowledge to a person of ordinary skill in the art.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for automatically adding an element to a target design, the method including:
identifying a source design (SD) element decoration, the SD element decoration corresponding to a design element that was originally defined in a source design, wherein the source design is a different design to the target design; and
automatically adding a new element to the target design, wherein the new element is based on the SD element decoration and adding the new element to the target design includes:
calculating a new position for the new element, wherein the new position for the new element is based on an original position of the SD element decoration in the source design;
calculating a new size for the new element, wherein the new size for the new element is based on an original size of the SD element decoration in the source design; and
adding the new element to the target design using the new size and the new position.

2. The computer implemented method of claim 1, wherein the new position and/or the new size for the new element are calculated based on a page size of the target design.

3. The computer implemented method of claim 1, further including calculating a scale factor, the scale factor representing a ratio between a page size of the source design and a page size of the target design, and wherein the new position and/or the new size for the new element are calculated based on the scale factor.

4. The computer implemented method of claim 1, wherein the new position and/or the new size for the new element are calculated based on an anchor property associated with the SD element decoration, the anchor property having a value that indicates a general position of the SD element decoration in the source design.

5. The computer implemented method of claim 1, wherein the new position and/or the new size for the new element are calculated based on a coverage property associated with the SD element decoration, the coverage property having a value that indicates an extent of the source design covered by the SD element decoration.

6. The computer implemented method of claim 1, further including:
   identifying a source design (SD) non-element decoration, the SD non-element decoration defined by a design- or page-level attribute of the source design; and
   adding the SD non-element decoration to the target design,
   wherein the SD non-element decoration is defined by a background attribute of the source design.

7. The computer implemented method of claim 1, further including:
   processing the target design to automatically identify a target design (TD) element decoration; and
   deleting the TD decoration from the target design.

8. The computer implemented method of claim 1, wherein identifying the SD element decoration includes processing the source design to automatically identify the SD element decoration.

9. The computer implemented method of claim 8, wherein processing the source design to automatically identify the SD element decoration includes:
   determining whether a first element of the source design is an element decoration or not based on one or more of: a type of the first element; content of the first element; a position of the first element; and a size of the first element.

10. The computer implemented method of claim 8 wherein processing the source design to automatically identify the SD element decoration includes:
    processing a first element of the source design; and
    identifying that the first element of the source design is not an element decoration based on a determination that:
       the first element is an edge element;
       the first element encloses at least one other element that defines text content; and
       the first element does not cover an entire page.

11. The computer implemented method of claim 8 wherein processing the source design to automatically identify the SD element decoration includes:
    processing a first element of the source design; and
    identifying that the first element of the source design is an element decoration based on a determination that:
       the first element is an edge element; and
       the first element does not enclose any other elements that define text content.

12. The computer implemented method of claim 11, wherein the first element is an edge element if at least one corner of the first element is positioned on or outside of a page edge.

13. The computer implemented method of claim 8 wherein processing the source design to automatically identify the SD element decoration includes:
    processing a first element of the source design; and
    identifying that the first element of the source design is an element decoration based on a determination that:
       the first element is an edge element;
       the first element covers an entire page.

14. A computer processing system including:
    a processing unit; and
    a non-transitory computer-readable storage medium storing instructions, which when executed by the processing unit, cause the processing unit to perform a method for automatically adding an element to a target design, the method including:
       identifying a source design (SD) element decoration, the SD element decoration corresponding to a design element that was originally defined in a source design, wherein the source design is a different design to the target design; and
       automatically adding a new element to the target design, wherein the new element is based on the SD element decoration and adding the new element to the target design includes:
          calculating a new position for the new element, wherein the new position for the new element is based on an original position of the SD element decoration in the source design;
          calculating a new size for the new element, wherein the new size for the new element is based on an original size of the SD element decoration in the source design; and
          adding the new element to the target design using the new size and the new position.

15. The computer processing system of claim 14, wherein the new position and/or the new size for the new element are calculated based on a page size of the target design.

16. The computer processing system of claim 14, wherein the method further includes calculating a scale factor, the scale factor representing a ratio between a page size of the source design and a page size of the target design, and wherein the new position and/or the new size for the new element are calculated based on the scale factor.

17. A non-transitory storage medium storing instructions executable by processing unit to cause the processing unit to perform a method for automatically adding an element to a target design, the method including:
    identifying a source design (SD) element decoration, the SD element decoration corresponding to a design element that was originally defined in a source design, wherein the source design is a different design to the target design; and
    automatically adding a new element to the target design, wherein the new element is based on the SD element decoration and adding the new element to the target design includes:
       calculating a new position for the new element, wherein the new position for the new element is based on an original position of the SD element decoration in the source design;

calculating a new size for the new element, wherein the new size for the new element is based on an original size of the SD element decoration in the source design; and adding the new element to the target design using the new size and the new position.

18. The non-transitory storage medium of claim 17, wherein the new position and/or the new size for the new element are calculated based on a page size of the target design.

19. The non-transitory storage medium of claim 17, wherein the method further includes calculating a scale factor, the scale factor representing a ratio between a page size of the source design and a page size of the target design, and wherein the new position and/or the new size for the new element are calculated based on the scale factor.

20. The non-transitory storage medium of claim 17, wherein the new position and/or the new size for the new element are calculated based on an anchor property associated with the SD element decoration, the anchor property having a value that indicates a general position of the SD element decoration in the source design.

* * * * *